(12) United States Patent
Lark et al.

(10) Patent No.: US 7,722,453 B2
(45) Date of Patent: May 25, 2010

(54) INTERACTIVE GAME PLAYING PREFERENCES

(75) Inventors: David R. Lark, Reno, NV (US); Craig A. Paulsen, Reno, NV (US); Richard E. Rowe, Reno, NV (US)

(73) Assignee: IGT, Reno, NV (US)

( * ) Notice: Subject to any disclaimer, the term of this patent is extended or adjusted under 35 U.S.C. 154(b) by 96 days.

(21) Appl. No.: 10/106,992

(22) Filed: Mar. 26, 2002

(65) Prior Publication Data

US 2002/0142825 A1 Oct. 3, 2002

Related U.S. Application Data

(63) Continuation-in-part of application No. 09/819,152, filed on Mar. 27, 2001.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............ 463/16; 296/181.6; 345/427; 463/20; 463/25; 463/42; 463/43; 705/64

(58) Field of Classification Search ........... 463/16–20, 463/25, 29, 21, 43; 273/138.1, 143
See application file for complete search history.

(56) References Cited

U.S. PATENT DOCUMENTS

| | | | |
|---|---|---|---|
| 4,335,809 A | 6/1982 | Wain | |
| 4,342,454 A | 8/1982 | Baer et al. | |
| 4,356,391 A | 10/1982 | Takeda | |
| 4,593,376 A | 6/1986 | Volk | |
| 4,689,742 A | 8/1987 | Troy et al. | |

(Continued)

FOREIGN PATENT DOCUMENTS

DE  44 03 688   8/1995

(Continued)

OTHER PUBLICATIONS

Communication Pursuant to Article 96(2) EPC, European Patent Office, Application No. 02 728 584.0-2221, Applicant: IGT, Date: Jan. 9, 2004.

(Continued)

*Primary Examiner*—John M. Hotaling, II
*Assistant Examiner*—Paul A. D'Agostino
(74) *Attorney, Agent, or Firm*—Weaver Austin Villeneuve & Sampson LLP

(57) ABSTRACT

A disclosed gaming machine may be customized for game play according to one or more preferences using preference information that is not correlated to an identity of a player. Therefore, the gaming machine may be configured to one or more player preferences without requiring the player to reveal their identity. The gaming machine may receive the preference information from at least one of a configuration instrument designed to store preference information, such as a cashless ticket voucher, ii) a display interface on the gaming machine, iii) a remote server, iv) a speech recognition interface on the gaming machine and v) combinations thereof. The preference information used to configure the gaming machine may be selected by the player, selected by a gaming establishment, generated by the gaming machine and combinations thereof.

91 Claims, 13 Drawing Sheets

U.S. PATENT DOCUMENTS

| | | | |
|---|---|---|---|
| 4,695,053 A | 9/1987 | Vazquez et al. | |
| 4,764,666 A | 8/1988 | Bergeron | |
| 5,043,889 A | 8/1991 | Lucey | |
| 5,073,700 A | 12/1991 | D'Onofrio | |
| 5,110,129 A | 5/1992 | Alvarez | |
| 5,212,369 A | 5/1993 | Karlisch et al. | |
| 5,265,874 A | 11/1993 | Dickinson et al. | |
| 5,277,424 A | 1/1994 | Wilms | |
| 5,395,242 A | 3/1995 | Slye et al. | |
| 5,429,361 A | 7/1995 | Raven et al. | |
| 5,452,379 A | 9/1995 | Poor | |
| 5,470,079 A | 11/1995 | LeStrange et al. | |
| 5,475,740 A | 12/1995 | Biggs, Jr. et al. | |
| 5,488,411 A | 1/1996 | Lewis | |
| 5,494,287 A | 2/1996 | Manz | |
| 5,537,314 A | 7/1996 | Kanter | |
| 5,586,936 A | 12/1996 | Bennett et al. | |
| 5,638,426 A | 6/1997 | Lewis | |
| 5,655,961 A | 8/1997 | Acres et al. | |
| 5,679,007 A | 10/1997 | Potdevin et al. | |
| 5,679,077 A | 10/1997 | Pocock et al. | |
| 5,704,835 A | 1/1998 | Dietz, II | |
| 5,711,708 A | 1/1998 | Fischer | |
| 5,761,647 A | 6/1998 | Boushy | 705/10 |
| 5,766,076 A | 6/1998 | Pease et al. | |
| 5,779,548 A | 7/1998 | Asai et al. | |
| 5,800,268 A | 9/1998 | Molnick | |
| 5,816,918 A * | 10/1998 | Kelly et al. | 463/16 |
| 5,820,459 A | 10/1998 | Acres et al. | |
| 5,823,873 A | 10/1998 | Moody | |
| 5,830,067 A | 11/1998 | Graves et al. | |
| 5,851,149 A | 12/1998 | Xidos et al. | |
| 5,902,983 A | 5/1999 | Crevelt et al. | |
| 5,983,196 A | 11/1999 | Wendkos | |
| 5,990,885 A | 11/1999 | Gopinath | |
| 6,001,016 A | 12/1999 | Walker et al. | |
| 6,003,013 A | 12/1999 | Boushy | 705/10 |
| 6,004,211 A | 12/1999 | Brenner et al. | |
| 6,007,426 A | 12/1999 | Kelly et al. | |
| 6,012,983 A | 1/2000 | Walker et al. | 463/20 |
| 6,015,344 A | 1/2000 | Kelly et al. | |
| 6,048,269 A | 4/2000 | Burns | |
| 6,068,552 A | 5/2000 | Walker et al. | 463/21 |
| 6,077,163 A | 6/2000 | Walker et al. | |
| 6,089,975 A | 7/2000 | Dunn | 463/16 |
| 6,099,408 A | 8/2000 | Schneier et al. | |
| 6,110,041 A | 8/2000 | Walker et al. | 463/20 |
| 6,113,495 A | 9/2000 | Walker et al. | 463/42 |
| 6,116,906 A | 9/2000 | Rifkin | |
| 6,149,522 A | 11/2000 | Alcorn et al. | |
| 6,152,822 A | 11/2000 | Herbert | |
| 6,162,122 A | 12/2000 | Acres et al. | |
| 6,165,072 A | 12/2000 | Davis et al. | |
| 6,183,362 B1 | 2/2001 | Boushy | 463/25 |
| 6,186,404 B1 | 2/2001 | Ehrhart et al. | |
| 6,203,427 B1 * | 3/2001 | Walker et al. | 463/16 |
| 6,264,560 B1 | 7/2001 | Goldberg et al. | |
| 6,264,561 B1 | 7/2001 | Saffari | |
| 6,270,409 B1 | 8/2001 | Shuster | |
| 6,287,201 B1 | 9/2001 | Hightower | |
| 6,287,202 B1 | 9/2001 | Pascal et al. | |
| 6,293,866 B1 | 9/2001 | Walker et al. | |
| 6,315,665 B1 | 11/2001 | Faith | |
| 6,343,988 B1 | 2/2002 | Walker et al. | |
| 6,394,907 B1 | 5/2002 | Rowe | |
| 6,409,602 B1 | 6/2002 | Wiltshire et al. | |
| 6,450,885 B2 | 9/2002 | Schneier et al. | |
| 6,456,977 B1 | 9/2002 | Wang | |
| 6,478,676 B1 | 11/2002 | Dayan | |
| 6,511,377 B1 | 1/2003 | Weiss | |
| 6,533,663 B1 | 3/2003 | Iwao et al. | |
| 6,554,709 B1 | 4/2003 | Brenner et al. | |
| 6,572,477 B2 | 6/2003 | Hightower | |
| 6,592,460 B2 | 7/2003 | Torango | |
| 6,645,068 B1 | 11/2003 | Kelly et al. | |
| 6,645,077 B2 | 11/2003 | Rowe | |
| 6,675,152 B1 | 1/2004 | Prasad | |
| 6,685,567 B2 | 2/2004 | Cockerille et al. | |
| 6,709,333 B1 | 3/2004 | Bradford et al. | |
| 6,724,385 B2 | 4/2004 | Takatsuka et al. | |
| 6,743,098 B2 | 6/2004 | Urie et al. | |
| 6,758,757 B2 * | 7/2004 | Luciano et al. | 463/43 |
| 6,804,763 B1 | 10/2004 | Stockdale et al. | |
| 6,863,608 B1 | 3/2005 | LeMay et al. | |
| 6,866,586 B2 | 3/2005 | Oberberger et al. | |
| 8,863,608 | 3/2005 | LeMay et al. | |
| 6,942,574 B1 | 9/2005 | LeMay et al. | |
| 6,979,266 B2 | 12/2005 | LeMay et al. | |
| 7,008,319 B2 | 3/2006 | Montgomery et al. | |
| 7,083,520 B2 | 8/2006 | Rowe | |
| 2001/0036858 A1 | 11/2001 | McNutt et al. | |
| 2002/0042297 A1 | 4/2002 | Torango | |
| 2002/0077712 A1 | 6/2002 | Safaei et al. | |
| 2002/0142815 A1 * | 10/2002 | Candelore | 463/1 |
| 2002/0142825 A1 | 10/2002 | Lark et al. | |
| 2002/0142846 A1 | 10/2002 | Paulsen | |
| 2002/0147047 A1 | 10/2002 | Letovsky et al. | |
| 2002/0147640 A1 | 10/2002 | Daniele et al. | |
| 2002/0151366 A1 | 10/2002 | Walker et al. | |
| 2003/0050806 A1 | 3/2003 | Friesen et al. | |
| 2003/0073497 A1 | 4/2003 | Nelson | |
| 2003/0083943 A1 | 5/2003 | Adams et al. | |
| 2003/0203756 A1 | 10/2003 | Jackson | |
| 2004/0002379 A1 * | 1/2004 | Parrott et al. | 463/29 |
| 2004/0147314 A1 | 7/2004 | LeMay et al. | |
| 2005/0003883 A1 | 1/2005 | Muir et al. | |
| 2005/0170890 A1 | 8/2005 | Rowe et al. | |
| 2006/0194633 A1 | 8/2006 | Paulsen | |
| 2008/0076548 A1 | 3/2008 | Paulsen | |

FOREIGN PATENT DOCUMENTS

| | | |
|---|---|---|
| DE | 19905076 | 2/1999 |
| DE | 19944140 | 9/1999 |
| EP | 0887753 | 12/1998 |
| EP | 1039 423 | 9/2000 |
| EP | 1039423 | 9/2000 |
| EP | 1087323 | 3/2001 |
| EP | 1136930 | 3/2001 |
| EP | 1 396 829 | 3/2004 |
| GB | 2 383 880 | 7/2003 |
| WO | 00/38089 | 6/2000 |
| WO | WO 00/38089 | 6/2000 |
| WO | WO 00/76239 | 12/2000 |
| WO | WO 00/79489 | 12/2000 |
| WO | WO00/79489 | 12/2000 |
| WO | WO 01/75815 | 10/2001 |
| WO | WO 01/81093 | 11/2001 |
| WO | WO 02/01458 | 1/2002 |
| WO | WO02/077935 | 10/2002 |
| WO | WO 02/77935 | 10/2002 |
| WO | WO 2004/027584 | 4/2004 |
| WO | 05-028056 | 3/2005 |

OTHER PUBLICATIONS

European Search Report dated Aug. 16, 2005 from corresponding EP Application No. 02728584.0 (7 pages).

International Search Report and Written Opinion dated Nov. 24, 2005 from Corresponding PCT Application No. PCT/US2005/026696 (9 pages).

Microsoft Windows 95, 1995, Microsoft Corporation, pp. 12 and 61 (4 pages).

U.S. Office Action dated Nov. 7, 2002 from corresponding U.S. Appl. No. 09/819,152.

U.S. Office Action dated Dec. 14, 2004 from corresponding U.S. Appl. No. 09/819,152.

International Search Report and Written Opinion dated Feb. 27, 2006 form a related PCT Application No. PCT/US2005/036116 (10 pages).

U.S. Office Action dated Mar. 27, 2007 from corresponding U.S. Appl. No. 09/819,152.

Office Action dated Jul. 13, 2007 from corresponding U.S. Appl. No. 10/910,407.

Final Office Action dated Apr. 29, 2003 from corresponding U.S. Appl. No. 09/819,152.

Office Action dated Sep. 8, 2003 from corresponding U.S. Appl. No. 09/819,152.

Final Office Action dated Apr. 13, 2004 from corresponding U.S. Appl. No. 09/819,152.

Final Office Action dated Oct. 13, 2006 from corresponding U.S. Appl. No. 09/819,152.

International Search Report from corresponding PCT application PCT/US03/27137 mailed Jan. 15, 2004, 6 pgs.

Office Action from related U.S. Patent Appl. No. 10/242,149, dated May 6, 2004, 10 pages.

Final Office Action from related U.S. Patent Appl. No. 10/242,149, dated Dec. 2, 2004, 9 pages.

Office Action from related U.S. Patent Appl. No. 10/242,149, dated Mar. 22, 2005, 11 pages.

Office Action from related U.S. Patent Appl. No. 10/242,149, dated Nov. 15, 2005, 13 pages.

John Scarne, Scarne's New Complete Guide to Gambling, 1974, Simon and Schuster, pp. 39-41.

U.S. Office Action mailed Oct. 13, 2006, from corresponding U.S. Appl. No. 10/915,117.

* cited by examiner

INTERACTIVE GAME PLAYING PREFERENCES

CROSS-REFERENCE TO RELATED APPLICATIONS

This application is a continuation-in-part of U.S. patent application Ser. No. 09/819,152 entitled "INTERACTIVE GAME PLAYING PREFERENCES", filed Mar. 27, 2001, naming Craig Paulsen as inventor, which is incorporated herein by reference in its entirety for all purposes.

BACKGROUND OF THE INVENTION

This invention relates to game playing methods for gaming machines such as video slot machines and video poker machines. More particularly, the present invention relates to methods of allowing game players and gaming establishments to customize game play on gaming machines.

As technology in the gaming industry progresses, the traditional mechanically driven reel slot machines are being replaced with electronic counterparts having CRT, LCD video displays or the like and gaming machines such as video slot machines and video poker machines are becoming increasingly popular. Part of the reason for their increased popularity is the nearly endless variety of games that can be implemented on gaming machines utilizing advanced electronic technology. In some cases, newer gaming machines are utilizing computing architectures developed for personal computers. These video/electronic gaming advancements enable the operation of more complex games, which would not otherwise be possible on mechanical-driven gaming machines and allow the capabilities of the gaming machine to evolve with advances in the personal computing industry.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a players attention to various game features and to heighten the players interest in additional game play. Maintaining a game player's interest in game play is an important consideration for a gaming machine operator.

One related method of gaining and maintaining a game player's interest in game play is loyalty point programs offered by the various casinos. Loyalty point programs provide rewards to players that typical correspond to a percentage of the player's game play at one or more casinos. Loyalty point rewards may be free meals, free lodging and free entertainment. These rewards may help to sustain a game player's interest in additional game play. However, a disadvantage of current loyalty point programs is that loyalty point information is not easily accessible to game players. For instance, a player can not easily determine how many loyalty points they have accrued, how many points are needed to obtain a specific reward and the amount of loyalty points that may be rewarded for a specific activity. The absence of these features, which are common in loyalty point programs such as airline mile programs, may limit the value of gaming loyalty point programs for a game player and the value these programs have on increasing a game player's interest in game play.

Another related method of gaining and maintaining game player's interest in game play is an arrangement of various types of gaming machine and prize displays on a casino floor. Often, casinos find that particular arrangements on the casino floor of gaming machines maximize game play. Specifically, games may be placed in certain locations on the floor to attract customers into the casino and maximize game play on the various gaming machines. The location of a particular gaming machine in the arrangement may depend on a prize, a type of game or other gaming features offered on the gaming machine such as particular audio effects and visual effects. For example, a gaming machine offering a particular prize or bonus feature, which is popular, might be placed near the door to attract customers into the casino. In fact, the distribution of gaming machines on a casino floor is sometimes considered a proprietary secret of casinos.

Over time, what was once a very enticing arrangement becomes less interesting to players. However, play can be increased again by rearranging the layout of gaming machines on the casino floor. Unfortunately, changing the distribution of gaming machines on the casino floor requires that someone physically move the gaming machines to different locations. This can be a very tedious and time-consuming exercise.

Further, floor layouts are designed to appeal to as many game player's as possible. However, for any layout, some player's may like or dislike the layout depending on personal preferences. Thus, it is nearly impossible to design a floor layout that will appeal uniformly to every game player's preferences.

Accordingly, it would be desirable to provide game playing methodologies for gaming machines that maintain and increase game playing interest and also reduce a frequency of rearrangement of gaming machines on the casino floor.

SUMMARY OF THE INVENTION

This invention addresses the indicated above by providing a gaming machine that may be customized for game play according to one or more preferences using preference information that is not correlated to an identity of a player. Therefore, the gaming machine may be configured to one or more player preferences without requiring the player to reveal their identity. The gaming machine may receive the preference information from at least one of a configuration instrument designed to store preference information, such as a cashless ticket voucher, ii) a display interface on the gaming machine, iii) a remote server, iv) a speech recognition interface on the gaming machine and v) combinations thereof. The preference information used to configure the gaming machine may be selected by the player, selected by a gaming establishment, generated by the gaming machine and combinations thereof.

One aspect of the present invention provides a method of configuring a gaming machine according to one or more preferences. The method may be generally characterized as comprising: 1) receiving preference information from at least one of: i) a first configuration instrument designed to store preference information, ii) a display interface on the gaming machine, iii) a remote server, iv) a speech recognition interface on the gaming machine and v) combinations thereof, where the preference information is not correlated to an identity of a player so that the identity of the player can not be determined from the preference information; 2) configuring the gaming machine using the preference information; and 3) executing a game play on the gaming machine configured with preference information.

In particular embodiments, the preference information may comprise one or more of promotional opportunities, preferred games, preferred game features for said preferred games, preferred gaming machine settings, preferred bonus games and preferred progressive games. The preferred games may be selected from the group consisting of video slots games, video poker games, video blackjack games, video pachinko games, video card games, video keno games and video games of chance. The preferred gaming features for the preferred games may be selected from the group consisting of game versions, game color schemes, game graphical features, a game presentation speed, game paytables and game audio features. The preferred gaming machine settings may be selected from the group consisting of a volume setting, an input interface configuration, a display setting, a denomination setting, a betting preference settings, a language setting and a beverage setting.

The preference information may be selected by a patron of a gaming establishment that maintains the gaming machine or the preference information may be selected by a gaming establishment that maintains the gaming machine. In one embodiment, the method may comprise executing a game play on the gaming machine and generating a second configuration instrument without receiving preference information during a game play session from a game player. Therefore, the second configuration instrument may store preference information received from a remote server, preference information generated by the gaming machine based upon the gaming play and combinations thereof. In general, the gaming machine may be configured in one or more of the follow ways: 1) without receiving a player tracking card from a game player participating in the game play, 2) without receiving identification information from a user participating in the game play, 3) without accessing a player tracking account of a user participating in the game play and 4) without accessing a remote server connected to the gaming machine.

In other embodiments, the first configuration instrument may be selected from the group consisting of a printed ticket, a cell phone, a magnetic striped-card, a smart card, an optical scan sheet, a media printed with preference information, a cell phone and a hand-held computing device. The method may also comprise reading the preference information from the first configuration instrument where the preference information is read from the first configuration instrument using one or more of a ticket reader, a bar-code reader, a card reader, a wire-less interface, a bill validator, an optical scan sheet reader, a text scanner and a smart card reader. The method may also comprise displaying the preference information to a video display.

In yet other embodiments, the first configuration instrument may be designed to store authentication information used to validate the first configuration instrument where the authentication information is selected from the group consisting of a bar code, an instrument type, an issue date, a validation number, an issue time, an instrument number, an instrument sequence number, a gaming machine identification number and biometric information. Further, the first configuration instrument may be designed to store indicia of credit information used to add credits for the game play on the gaming machine where the credits are promotional credits.

The method may also comprise one or more of the following: a) storing preference information to the first configuration instrument such as at the end of a game play session on the gaming machine and b) configuring a second gaming machine using the first configuration instrument. A configuration of the second gaming machine may be the same as the configuration of the gaming machine or a configuration of the second gaming machine may be different than the configuration of the gaming machine.

The method may also comprise generating a second configuration instrument where the second configuration instrument is a generated using a printer and a printable media. Further, the second configuration instrument may store one or more of the following preference information that is stored on the first configuration instrument, preference information that is input using the display interface, preference information received from the remote server, preference information generated by the gaming machine, preference information input using the speech recognition interface and combinations thereof. In addition, the method may comprise one or more of a) storing indicia of credit information to the second configuration instrument where the indicia of credit information may be used to add credits to the gaming machine, b) configuring a second gaming machine using the second configuration instrument, and c) adding credits used for a game play on a second gaming machine using the second configuration instrument.

In general, the method of configuring the gaming machine may comprise one or more of the following: i) adding credits to the gaming machine indicia of credit information stored on the first configuration instrument, ii) authenticating the indicia of credit information stored on the first configuration instrument, iii) sending preference information to the remote server, iv) authenticating the first configuration instrument, v) when the first configuration instrument is not authentic, blocking configuration of the gaming machine using the preference information received from the first configuration instrument, vi) sending an authentication request to the remote server wherein the authentication request comprises information used by the remote server to authenticate the first configuration instrument, vii) receiving an authentication reply from the remote server wherein the authentication reply comprises information indicating an authentication status of the first configuration instrument, viii) when the authentication status of the first configuration instrument is non-authentic, blocking the configuration of the gaming machine using the preference information received from the first configuration instrument, and ix) storing the preference information to a memory storage device on the gaming machine.

In another embodiment, the method may be used to configure a bonus game played on the gaming machine as follows: a) for a bonus game that uses game events from multiple games to determine a bonus game outcome, storing bonus game information about a state of the bonus game to a second configuration instrument, b) on a second gaming machine, reading bonus game information from the second configuration instrument and initializing the bonus game to the state of the bonus game indicated by the bonus game information and c) reading bonus game information from the first configuration instrument and initializing the bonus game to a state of the bonus game indicated by the bonus game information.

Another aspect of the present invention provides a gaming machine. The gaming machine may be generally characterized as comprising: 1) a master gaming controller that is designed or configured i) to control one or more games played on the gaming machine ii) to receive preference information and iii) to configure the gaming machine using the preference information wherein the preference information is not correlated to an identity of a player so that the identity of the player can not be determined from the preference information; and 2) one or more input devices used to input the preference information into the gaming machine. The preference information may be selected by one or more of the following entities: 1) a patron of a gaming establishment that maintains the gaming machine, 2) a gaming establishment that maintains the gaming machine and combinations thereof.

In particular embodiments, the preference information may comprise one or more of promotional opportunities, preferred games, preferred game features for said preferred games, preferred gaming machine settings, preferred bonus games and preferred progressive games. The preferred games are selected from the group consisting of video slots games, video poker games, video blackjack games, video pachinko games, video card games, video keno games and video games of chance. The preferred gaming features for said preferred games is selected from the group consisting of game versions, game color schemes, game graphical features, a game presentation speed, game paytables and game audio features. The preferred gaming machine settings is selected from the group consisting of a volume setting, an input interface configuration, a display setting, a denomination setting, a betting preference settings, a language setting and a beverage setting.

In other embodiments, the one or more input devices may be designed to read information stored on a first configuration instrument. The first configuration instrument may be selected from the group consisting of a printed ticket, a cell phone, a magnetic striped-card, a smart card, an optical scan sheet, a media printed with preference information, a cell phone and a hand-held computing device. The preference information may be read from the first configuration instrument using one or more of a ticket reader, a bar-code reader, a card reader, a wire-less interface, a bill validator, an optical scan sheet reader, a text scanner and a smart card reader.

The master gaming controller is further designed or configured to authenticate the first configuration instrument. Further, the first configuration instrument may be designed to store authentication information used to authenticate the first configuration instrument where the authentication information is selected from the group consisting of a bar code, an instrument type, an issue date, a validation number, an issue time, an instrument number, an instrument sequence number, a gaming machine identification number and biometric information. In addition, the first configuration instrument may be designed to store indicia of credit information used to add credits for game play on the gaming machine wherein the credits are promotional credits.

Also, the gaming machine may also comprise one or more output devices used to store the preference information to the first configuration instrument. In some instances, the first configuration instrument may be used to configure a second gaming machine. A configuration of the second gaming machine may be the same as the configuration of the gaming machine or a configuration of the second gaming machine may be different than the configuration of the gaming machine. The first configuration instrument may also be used as an indicia of credit for game play on the gaming machine.

In other embodiments, the gaming machine may also comprise a video display used to display the preference information. The video display may include a touch screen used to input the preference information. Further, the master gaming controller is further designed or configured to generate a touch screen interface used to input the preference information.

The present invention may be implemented without the use of a player tracking infrastructure and player identification information. For example, when one of the input devices is a card reader used to read player tracking information from a player tracking card, the gaming machine may be configured without receiving the player tracking card or without accessing a player tracking account of a user that plays the game on the gaming machine. Further, the gaming machine may be configured without accessing a remote server such as a player tracking server. In addition, the gaming machine may be configured without receiving identification information from a user that plays the game on the gaming machine.

In another embodiment, the gaming machine may also comprise a printer designed to print on a printable media. The master gaming controller may also further designed or configured to generate a second configuration instrument by using the printer to print preference information to the printable media. The second configuration instrument may store one or more of the following: preference information that is stored on a first configuration instrument, preference information that is input using the display interface, preference information that is received from a remote server, preference information that is generated by the gaming machine, preference information that is input using the speech recognition interface and combinations thereof. The second configuration instrument generated on the printer may be configured to be used as an indicia of credit for game play on the gaming machine and the master gaming controller may be further designed or configured to store credits to the second configuration instrument.

In yet another embodiment, the gaming machine may further comprise a communication interface used to communicate with a remote server and the master gaming controller is further designed or configured to send the preference information to the remote server using the communication interface. Further, the master gaming controller may be designed or configured to send an authentication request to the remote server where the authentication request comprises at least information used by the remote server to authenticate a configuration instrument. The gaming machine may also a memory device used to store the preference information. In a particular embodiment, the master gaming controller may be further designed or configured to generate the preference information. In an additional embodiment, the gaming machine may further comprise a microphone used to receive preference information and a sound projection device used to output the preference information. The master gaming controller may be further designed or configured to recognize speech patterns containing the preference information input using the microphone.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features of the present invention will be presented in more detail in the following detailed description of the invention and the associated figures.

DESCRIPTION OF THE PREFERRED EMBODIMENTS

Figure 1A:
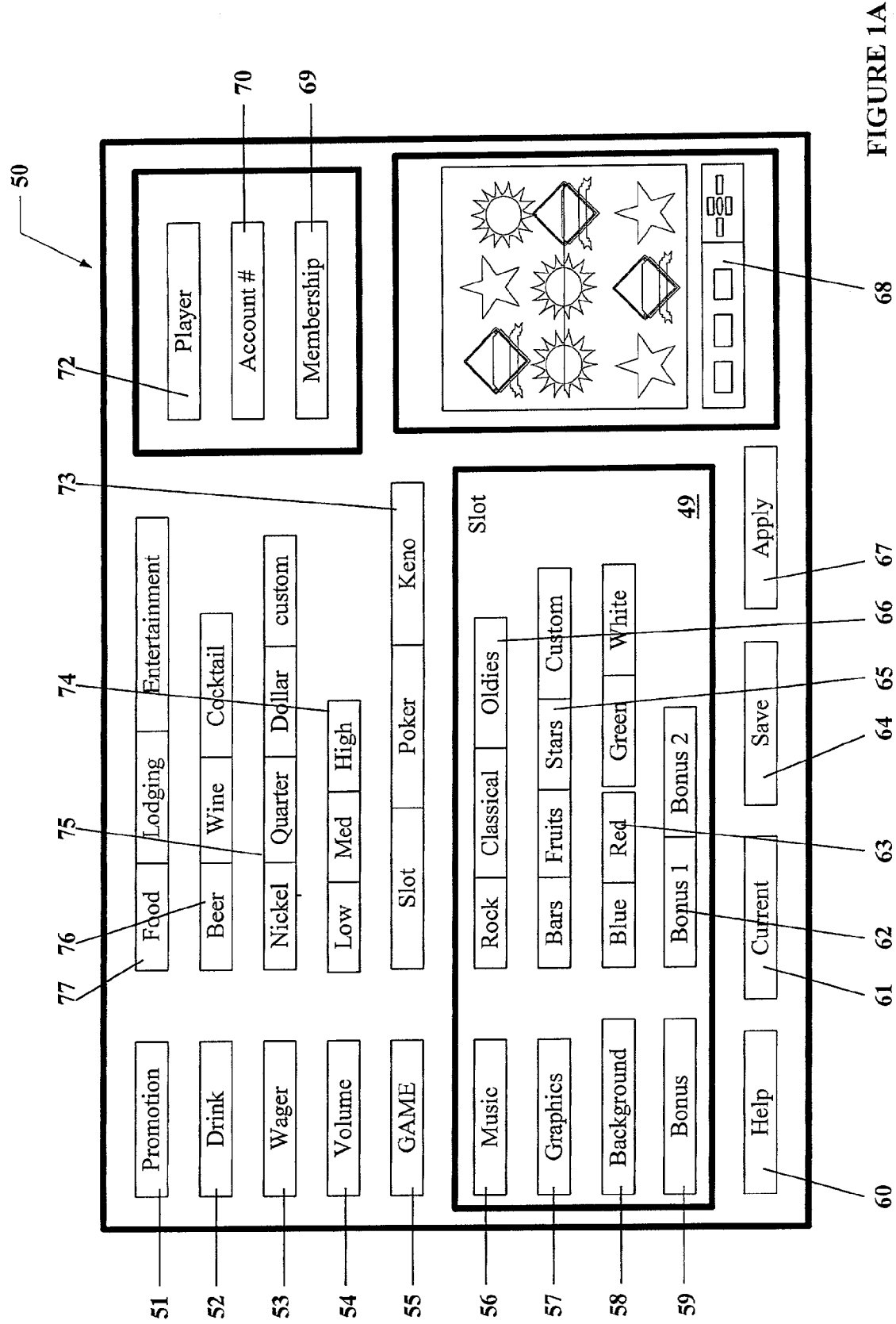
FIG. 1A is a block diagram of an interface for modifying a player preference account.

FIG. 1A is a block diagram of a user interface 50 for modifying a player preference account. The user interface 50 may be displayed on a computing device of some type such as a gaming machine or a home computer using a remote server designed or configured to store the player preference account and support the user interface 50 (see FIGS. 2 and 3 for more details). In one embodiment, the user interface may be accessed using a web browser. The user interface 50 may be used by a game player to create and modify a preference account that includes preference account information corresponding to one or more game playing options preferred by the player. The user interface 50 may be also be used by a game operator or a preference account administrator to create and modify preference accounts for a plurality of game players. One or more preference account options selected by the player or by a representative of a gaming entity such as a casino may be used to customize a game playing experience of the player. The preference account options selected by a player may be stored as preference account information on a preference account server (See FIG. 2). The preference account information may also be stored to a configuration instrument as preference information without the use of a preference account (see FIGS. 9-12).

The preference account information may include but is not limited to one or more of the following: 1) loyalty point account information and settings (See FIG. 1B), preferred promotional opportunities, preferred games and game feature settings for the games, preferred gaming machine settings, preferred bonus games, preferred progressive games and preferred service options. For instance, using the user interface 50, a player may choose to be informed about one or more promotional opportunities preferred by the player in a promotion category 51. Examples of promotional opportunities may be a discount at a restaurant when the player visits a casino during a certain time period or a lodging discount that becomes available to the player after participating in one or more activities such as playing a particular gaming machine at a particular casino location.

After selecting the promotion category button 51, a player may select from among a number of different promotional choices 77, such as food, lodging and entertainment, which may be available through the interface 50. The promotional choices 77 available on the interface 50 may change with time. Further, the promotional choices 77 available to the player may depend on a number of parameters particular to the player using the interface 50. For instance, a first time user of the interface 50 may be offered particular promotions that are different from a player that has used the interface, 50, multiple times. As another example, players may be offered different promotions according to their age, gender or other personal characteristics.

In general, the entire interface 50 may be customized according to characteristics of individual player or groups of players. For instance, a size of the text on the interface may be increased for older players or the interface 50 may provide interface settings that allow the interface to be customized according to the preferences of an individual player. For example, a number of interface formats may be available for selection by players that allow the preference account information to be displayed in different manners. The interface formats may differ from another in many ways such as by an amount of information stored on each page, a type of information stored on each page, a graphics scheme, a color scheme, a text font size, etc.

Additional menus and selections may be provided under each promotional category 77. For instance, after selecting the food promotion in 77, different restaurant selections in different categories such as American, Indian, Italian, Chinese or Mexican may be displayed and selected by the player using the interface 50. In one embodiment of the present invention, a player selecting one or more promotional opportunities may be contacted in some manner to encourage them to take advantage of a particular promotion. For instance, a player may be informed of promotional opportunities via e-mail, direct mail, phone solicitations or messages to a gaming machine based upon preference options selected by the player and stored in their preference account as preference account information. The player using the interface may be able to select the mode (e.g. phone, e-mail, etc.) used to contact them about a promotion.

Another type of preference a player may be able to specify using the interface 50 is a preferred service option. A few examples of a preferred service options, which are provided for illustrative purposes and are not meant to limit the invention, may be a drink that a player likes to be served, a type of snack that a player likes to be served or a preferred method of crediting awards at a gaming machine. In 50, a player may select the drink category 52 button which allows the player to select from a number of beverage types 76, such as beer, wine and cocktails that a player may be served while playing a game on a gaming machine or using some other service at an entertainment venue. For instance, preference account information previously entered by a player may be available at a restaurant used by the player in a casino. When a player has a selected a preferred beverage that is stored in a preference account, a waiter in the restaurant may obtain this information from a user interface, such as interface 50, and ask the player whether they would like to be served their preferred beverage. As another example, some gaming machines include a cocktail button that allows a player at the machine to request a drink. The cocktail button may be used with the present invention to allow a player's pre-selected beverage to be brought to the player. In yet another example, the player may be able to select a frequency at which they are served drinks such as every half hour, every hour, etc.

As mentioned above, as another example of preferred service option setting, a player may be allowed to select (not shown) a preferred method of receiving credits from a gaming machine. For instance, some newer gaming machines allow players to receive awards as a printed award ticket such as an EZ Pay™ ticket instead of cash. With the present invention, a player may specify to receive credits as an indicia of credit such as tokens dispensed from the gaming machine, to receive credits on a printed award ticket, to receive credits as a deposit to an account via an electronic fund transfer or combinations thereof. For instance, a player may specify to have 10% of their credits at a gaming machine received as tokens, to have 50% of their credits received as an award ticket and to have 40% of their credits deposited to a deposit account via an electronic fund transfer.

Another type of preference a player may be able to specify using the interface 50 is one or more preferred gaming machine setting. Again, the availability of the gaming machine settings may vary from one type of gaming machine to another type of gaming machine. A preferred gaming machine setting may allow the player to control various gaming machine features, such as but not limited to a volume for audio output from the gaming machine, a preferred gaming machine denomination, a preferred betting pattern, a preferred video display adjustment (e.g., contrast or brightness), an input configuration for the input devices on the gaming machine and preferred games on the gaming machine.

As an example of selecting a gaming machine setting, using the wager button 53 in the interface 50, a player may select from a number of gaming machine denominations 75, such as nickel, quarter, dollar or custom. The custom button may allow the player to specify a specific denomination such as a favorite number or a lucky number. The custom denomination feature may be enabled when a player is credited an award using an award ticket or electronic fund transfer. The denominations may vary as function of a local currency where the gaming machine is located. For instance, in the United Kingdom a player may select denominations in pence and pounds. A player may also be able to select a betting pattern (not shown in the figure) such as a multiple of the denomination selected on the gaming machine. Thus, when a player initiates a game on a gaming machine that has been configured to reflect the players selected preferences, the gaming machine may use the player's preferred betting preferences.

In another example of a gaming machine setting, a player may be able to select a volume setting on the gaming machine. After selecting the volume setting 54 on the gaming machine, the player may select a volume level option 74 such as a low, a medium or a high setting according to the individual taste of a player, e.g., some players may like a very noisy gaming machine while other player may prefer a quieter gaming machine during game play.

In another example of a gaming machine setting, a player may be to select a preferred game that the player likes to play on a gaming machine. This feature is only available on gaming machines offering multiple game choices. For instance, using the game button 55, a player may select from a number of different games 73 such as video slots, video poker and video keno. Other games which may be available as a player preference selection include but are not limited to video black jack games, video pachinko games, video card games, video keno games and video games of chance. As previously mentioned, additional menus (not shown) may be available with an preference account interface such as interface 50. For instance, a player may select from a number of different types of video poker games such as single player poker, double play poker, triple play poker, 10 play poker, 100 play poker, etc.

Another type of preference a player may be able to specify using the interface 50 is one or more preferred game feature settings for a preferred game selected by the player. The preferred game feature setting may vary according to the game selected. For example, one type of video slot game may allow different game feature setting than another type of video slot game or than a video poker game. The preferred game feature settings may include but are not limited to a game version, a game color scheme, game graphical features, a game presentation speed, a game pay-out table and a game audio feature. For instance, a player may be able to increase or decrease the speed of a game presentation within a specified range using a game presentation speed setting (not shown).

A player may use a game feature interface 49 portion of the interface 50 to select various game feature settings such as music types that may be played while a particular game is executed on the gaming machine. The music may be integrated into the game presentation or a player may be able to listen to the music separately through some output means, such as headphones, while the player is playing a game on the gaming machine. For instance, using the music button category 56, a player may select from one or more types of music categories 66 such as rock, classical or oldies. Again, under each category, additional music selections (not shown) may be available. Further additional categories, such as country music or alternative music, may also be available through the interface. The musical selections may be game specific, e.g. the musical selections may vary from video slot game to another or may vary between video slot games and video poker games. Thus, the format of game feature interface 49 may change depending on a game selection 73 made by the player.

Using the game feature 49 interface portion, a player may be able to select graphic patterns on a gaming machine such as color schemes and graphic symbols that are integrated into a game presentation displayed on the gaming machine. For instance, for a video slot game, a player may use the graphics button 57 to choose a symbol type 65, such as bars, fruits, stars and custom, which may be used in a video slot game presentation. When the fruit button is selected from the symbol types 65, fruits may be used as symbols in the video slot game presentation. The fruit button may include additional selections (not shown) such as types of fruits (e.g. oranges, apples, pears, cherries, strawberries, etc.) which a player may select. When the custom button is selected, a player may be able to select a custom graphic such as a picture of the player or a picture of pet, which may be integrated into a video game presentation on the gaming machine. For instance, in a video poker game, a player's face may be used as a face for a card such as a king or a queen. A player may download a picture in an electronic format using other menus (not shown) available on the interface 50. As another example, using the background category button 58, a player may select a background color 63, such as but not limited to blue, red, green or white, which may integrated into a video game presentation on the gaming machine.

As another example, a player may be able to select bonus games that are integrated into a game presentation displayed on the gaming machine. For example, by selecting the bonus category button 59, a player may be able to select one of two different bonus games 62 available in game feature setting menu 49. A player may also be able to select from a number of types of progressive games available with a particular video game presentation on the gaming machine. In some embodiments, the user interface 50 may be designed or configured to allow a player to design a custom or personal progressive game. For example, a player may be able to design a progressive game that is based upon a number of favorite games a player likes to play. In yet another example, a player may be able to select certain prizes and pay-out tables that a player may be utilized for determining a game award. An example of prize selection methodology is described with reference to U.S. application Ser. No. 09/515,717, "Name Your Prize Game Playing Methodology," by Binh T. Nguyen which is incorporated herein by reference in its entirety and for all purposes.

The user interface 50 may allow a player or user (e.g. an interface administrator) to view and possibly modify player identification information. Some information stored in the preference account, such as player identification information, may be privileged in that only an interface administrator or other entity with necessary access privileges may be able to modify the privileged information. For instance, an administrator may be able to view and modify a players name 72, an account number 70, a type of membership 69, a player's address (not shown) for many players. However, a player using the interface 50 may be able to only view and modify this information for their own account.

The type of membership 69 may correspond to a value of the player and accord different privileges to the player that may be selected. For instance, a player may be a platinum, a gold, a diamond or a silver member (displayed in 69) according to an amount or a frequency of game play by the player. Using the interface 50, platinum members may be able to make different preference selections than a silver member. For example, only platinum members may be allowed to select and to play certain games or use certain pay-out tables.

The user interface 50 may include a number of command buttons such as help 60, current 61, save 64 and apply 67 that allow a user of the interface 50 to execute different commands. For example, a user may be able to see the effects of game feature setting using the apply button 67. When the apply button is selected, a simulation of a game presentation using the game feature settings selected in 49 may be presented in window 68. In 68, the game simulation may allow the user to see different graphics implemented in a game presentation, hear different types of music and determine the functions of different input buttons on the gaming machine.

In other example, the help button 60 may allow the user to obtain help relating to using the interface 50. Help instructions may be displayed in window 68 or another window. The current button 61 may allow the user of the interface 50 to see their current preference account selections. The save button 64 may allow the user of the interface 50 to save a number of preference selections that have been made during a session using the interface 50 to a storage device of some type such as a hard drive on a preference account server (see FIG. 3).

In one embodiment of the present invention, the user interface 50 may allow the player to 50 to save a number of preference selections that have been made during a session using the interface 50 to a configuration instrument such as but not limited to a printed ticket, a magnetic striped card, a room key, a smart card, a cell phone, a personal digital assistant and a portable wireless device. The preference selections may be stored as preference information on the configuration instrument. In one instance, the preference information is not correlated to the identity of the player and the player may not be required to supply identification information such as a name.

Many game players may desire to customize a gaming machine according to one or more preferences but may not wish to provide identification information to a gaming establishment. One advantage of the present invention is that the configuration instrument may be used to configure a gaming machine according to one or more preference selections of the player while allowing the player to remain anonymous. Details of a configuration of a gaming machine using configuration instruments are described with respect to FIGS. 9-12.

In one embodiment, the preference account interface or the preference interface may help a player make preference selections. For instance, based upon a an age, a sex and an income level entered by the player or other demographic information entered by the player, preference selections corresponding to the player's demographic information may be displayed to the preference account interface or the preference interface. The player may choose these preference selections using the preference account interface or the preference interface. Again, the player may not have to supply identification information such as a name to receive this type of help.

Figure 1B:
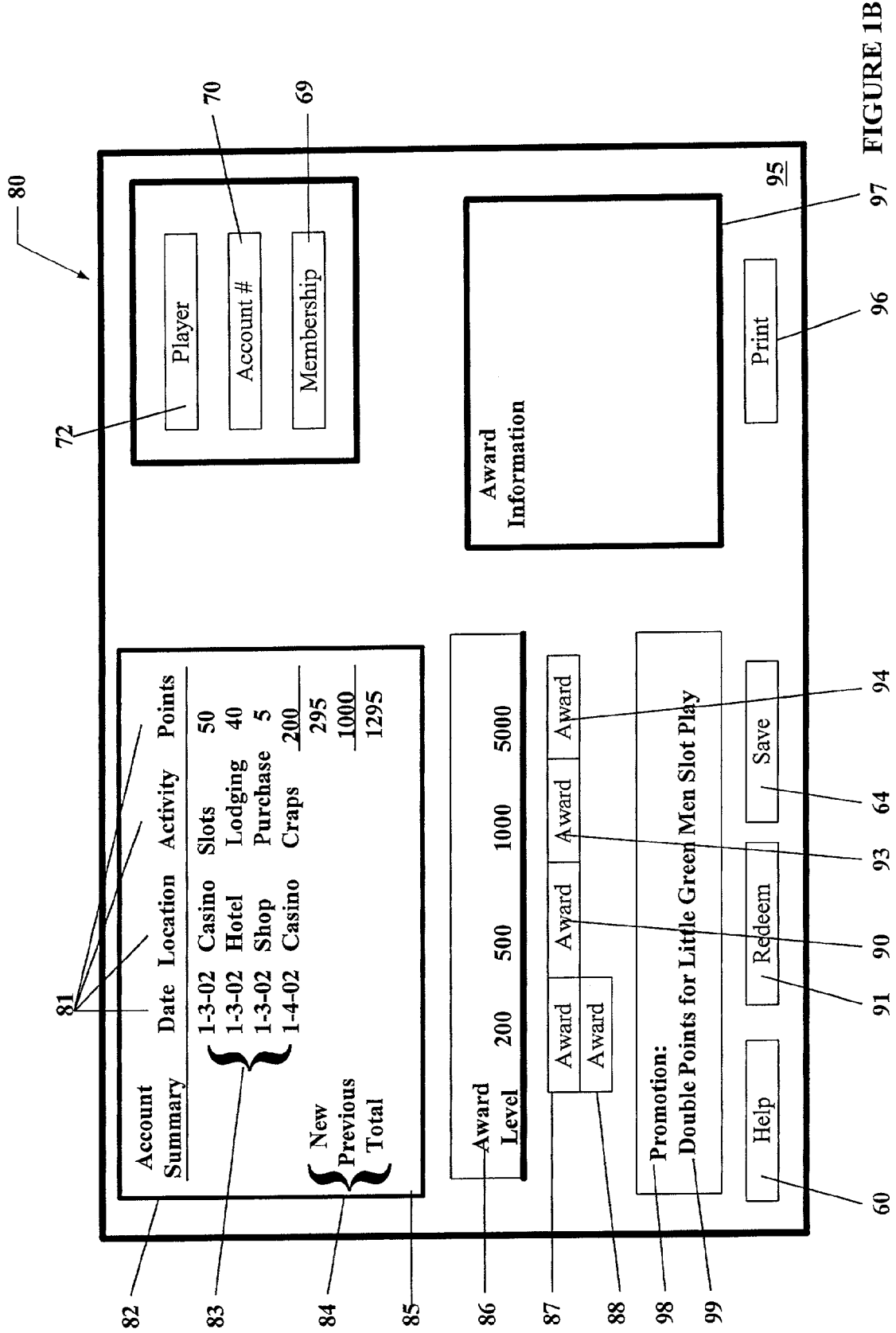
FIG. 1B is a block diagram of an interface for viewing a player preference account summary and redeeming awards.

FIG. 1B is a block of an interface 80 for viewing a player preference account summary and redeeming loyalty program awards. A player may be able to utilize interfaces with many different formats in the present invention. Thus, interface 50 (described in FIG. 1A) and interface 80 (described in FIG. 1B) have been described for illustrative purposes only and the present invention is not limited to the formats of these two interfaces. Further, a plurality of interface formats, including 50 and 80, may be available to a user of a preference account interface.

In 80, a player or a preference account administrator may be able to access a summary 82 of a player's loyalty point activity. In one embodiment, the summary may be accessed and viewed from a video display on a gaming machine (see FIG. 2). The summary 82 may include a number of loyalty point records 83. The loyalty point records 83 in the account summary 82 may be for a particular accounting period of a varying length such as a day, a week, a month, etc. Each loyalty point record may include of a number of fields 81, such as a date, a location, an activity and points awarded during the activity. Records for many types of activities that generate loyalty point awards, such as food purchases, entertainment purchases, lodging purchases, transportation purchases, merchandise purchases and game play, may be displayed in interface 80. For instance, on Jan. 3, 2002, the player played slots and earned 50 loyalty points, the player earned 40 loyalty points for their room purchase and the player earned 5 loyalty points for a merchandise purchase at a shop. The next day, Jan. 4, 2002, a player earned 200 loyalty points at a casino playing craps. The new, previous and total points 84 in the player's preference account are 295 loyalty points, 1000 loyalty points and 1295 loyalty points. Of course, these number are for illustrative purposes as their values may vary with time for a particular player and from account to account.

In 80, loyalty point award levels 86, such as two hundred, five hundred, one thousand and five thousand, may be displayed with awards, such as 87, 88, 90, 93 and 94 in each award level category. Typically, a value of an award corresponds to the number of loyalty points required to earn the award. Thus, award 94 in the five thousand loyalty point category will be more valuable than awards 87 and 88 in the two hundred loyalty point category.

By selecting an award button, such as 87, 88, 90, 93 and 94, a player may be able to find out additional information about the award in window 97. For instance, when the award is lodging, a player may be able to find out information about the lodging and availability of the lodging via window 97. In another example, when the award is a free meal, the player may be able to find a restaurant review in window 97.

When the player has accumulated enough loyalty points, a player may redeem one or more rewards using interface 80. For example, based upon the account summary information 82 displayed in interface 80 which shows the player has accumulated "1295 loyalty points," the player may be able to redeem one or more of awards, 87, 88, 90 and 93 with their "1295 loyalty points." For instance, the player may select an award corresponding to award button 93, which may be two free nights lodging at a casino, using the interface 80. When the player selects the redeem button 91, the award may be redeemed and the loyalty points may be deducted from the player's account. Another menu may appear that performs additional functions relating to the award such as allowing the player to make a reservation for the room and specifying a mailing address where the award may be sent. Further, the player may be able to obtain a hard copy of the account summary 82 and award redemption by printing out a record of some type to a printer using the print button 96.

In 80, a player may be notified of a various loyalty point promotions 98. The promotions may specify a number or range of loyalty points that a player may earn while participating in a particular event. The promotions may allow a gaming entity to promote various activities for a number of reasons such as to promote a new game being introduced at the casino or to encourage game play during specific periods of time. The promotions may vary with time. As an example of a promotion, a player may earn double loyalty points playing a "Little green men" slot game 99, i.e. twice the normal points a player would normally be awarded for participating in the activity. As another example, a player may earn double loyalty points (not shown) for activities at a casino during a certain time period.

Using the interface 80, a player may be able to enter and modify loyalty point account information using a number of loyalty point account settings (not shown). Examples of loyalty point account information that may modified or selected using interface 80 include a name (player) for the account, an address, contact information (e.g. phone numbers, fax numbers, e-mail addresses), tax information and preferred awards. The player or account administrator may enter and then save account information using the save button 64 in the interface 80.

User interfaces for modifying player preference accounts may displayed on many different types of computing devices such as a gaming machine, a personal digital assistant, a home computer, a kiosk located in a casino, a phone and a video display interface. In one embodiment, the video display interface may be a television monitor located in a hotel room. A touch screen, control pad or some other input device may be used with the television monitor to provide input to the preference account user interface.

The format of the user interface, such as 50 or 80, and the components comprising the user interface may vary according to the computing device on which the user interface is displayed. For instance, when the user interface 50 is displayed on a gaming machine the format of the interface may be different from when the interface is displayed on a personal digital assistant or phone. For example, using a home computer as the computing device, a player may be able to select many player preferences and view a large amount of account information at one time. However, when a phone is used as the computing device, a player may be only able to execute a limited number of commands, for example obtain an account summary, and view only a small amount of information at once. The number of interfaces, the format of the interfaces, the amount of information displayed on each interface, the type of information displayed, etc. on each interface is not limited to the interfaces, 50 and 80, described with respect to FIGS. 1A and 1B. Interfaces, 50 and 80, were described for illustrative purposes only.

A player playing a gaming machine customized to their own preferences may engage in longer gaming sessions than when playing on a non-customized gaming machine. Thus, an advantage of the interfaces described with reference to FIGS. 1A and 1B may be increased game playing satisfaction and hence prolonged player interest in game playing. Further, the ability to customize a player's game playing experience may reduce the amount of costly casino floor configurations performed by a casino. In addition, the ability to customize a loyalty point program and easily access loyalty point program information may increase a game player's satisfaction with these programs and encourage additional game play.

Figure 2:
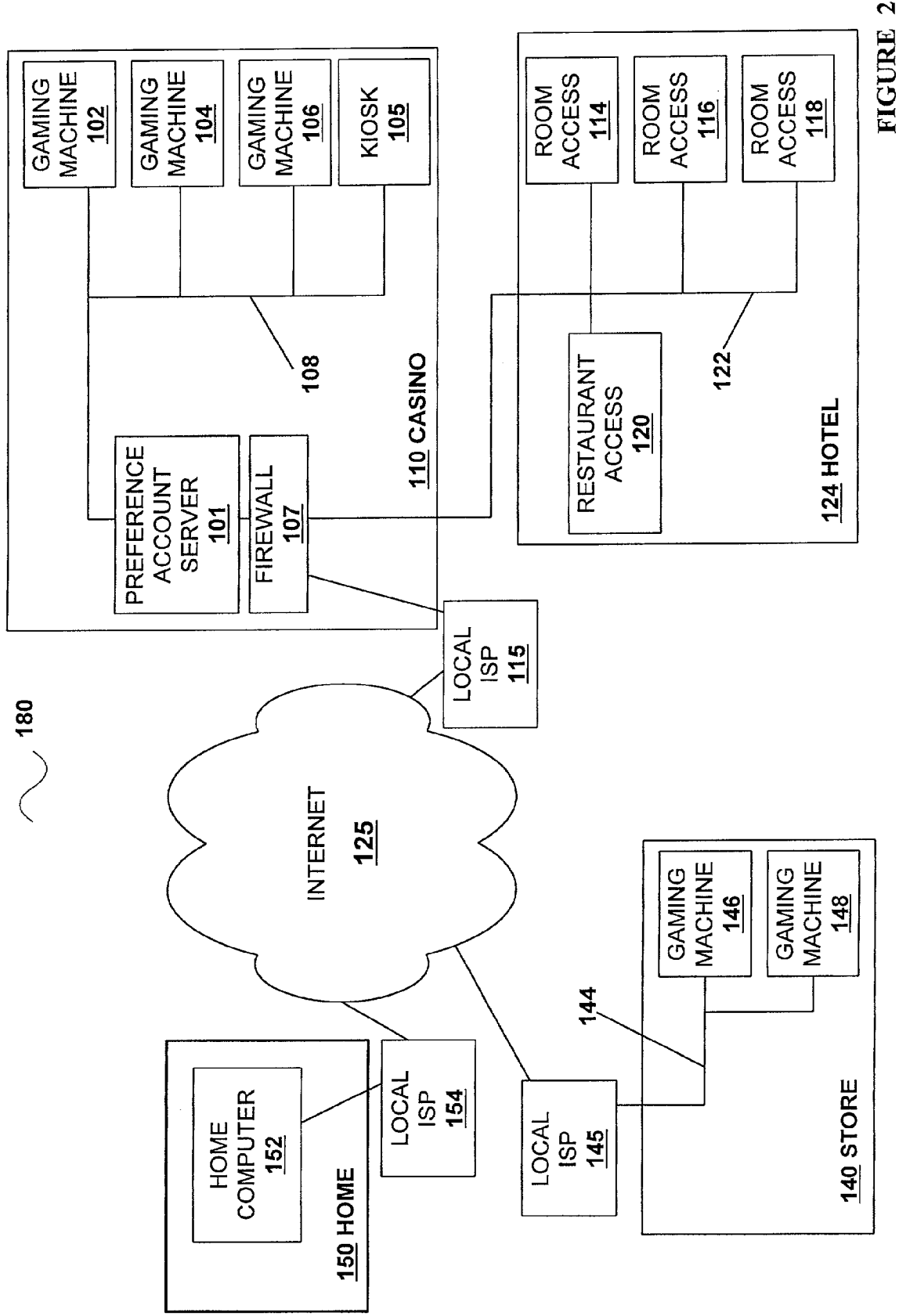
FIG. 2 is a block diagram of a preference account server connected to a number of local area and wide area networks.

FIG. 2 is a block diagram of a preference account server 101 connected to a number of local and wide area networks 180. As described above with respect to FIGS. 1A and 1B, user interfaces for modifying player preference accounts may displayed on many different types of computing devices such as a gaming machines (e.g. 102, 104, 106, 146, 148), a personal digital assistant, a home computer 152, a kiosk 105 located in a casino 110, a phone and a video display interface in a restaurant 120 or a hotel room (e.g. 114, 116 and 118) in a hotel 124. For instance, from the home computer 152 in a home 150, a player may access a player preference account stored on the preference account server 101 using an interface of some type. In one embodiment of the present invention, using the home computer 152, a person may access the preference account server using a web browser displaying an interface such as the interfaces described with reference to FIGS. 1A and 1B. Using a preference account interface via a web browser, a player may create or access a player preference account, may change preference account settings and may view preference account information such as loyalty point account information. To access the web interface, the home computer may connect with the preference account server using a connection to a local ISP (Internet Service Provider) 154 which is connected to the Internet 125. The preference account server 101 may support web access via a connection to the Internet 125 through a firewall 107 and a local ISP 115.

In another embodiment, using a preference selection interface via a web browser, the player may be able to use a printer connected to their home computer to generate a printed ticket that may be used as a configuration instrument for configuring a gaming machine (see FIGS. 9-12). The printed ticket may be in a format specified by the preference interface and may not require the player to provide identification information or account information. In this case, the preference interface may be used to make preference selections that are printed to the ticket. In another embodiment, the preference interface may be used to generate promotional coupons that may used by the player. For example, using the preference interface on their home computer, a player that speaks a foreign language may be able to generate a configuration instrument at home that allows a gaming machine to be configured in their native language prior to arriving at a gaming establishment.

The preference interface may supply additional information, such as a unique serial number or a unique bar-code, that is printed to the ticket and allows it to be used to configure a gaming machine. The additional information that is printed to the ticket, such as the unique serial number or the unique bar-code, may be encrypted by the host computer for security purposes. The encrypted information may allow the host computer to authenticate the printed ticket when it is used in a gaming machine. The preference account server 101 may include software applications that allow the player to anonymously select preferences via the preference interface and generate configuration instruments from a home computer.

In other embodiments, preference account information may be accessed through a preference account interface displayed on a kiosk such as a kiosk 105 in a casino 110, a preference account interface displayed on video display in a hotel room such as video displays, 114, 116 and 118, in a hotel 124 or a video display in a restaurant such as restaurant access 120. The restaurant access 120 and room accesses, 114, 116 and 118 are connected to the preference account server 101 via a local area network 122. The kiosk 105 in casino 110 is connected to the preference account server 101 via a local area network 108. The local area networks 108 and 122 may be wireless networks, wired networks or combinations thereof. The preference account interface used with the restaurant access 120 and room accesses, 114, 116 and 118 may be obtained through a web browser but is not limited to web access. For example, video displays with set top boxes may be used to access preference account information stored on the preference account server 101 using a custom interface only available over the local area network.

In yet another embodiment, a preference interface displayed on a kiosk such as a kiosk 105 in a casino 110, a preference account interface displayed on video display in a hotel room such as video displays, 114, 116 and 118, in a hotel 124 or a preference interface displayed on a video display in a restaurant such as restaurant access 120 may be used to select preferences that may be stored to a configuration instrument. As an example, when a printer is linked to the preference interface, the printer may be used to generate printed ticket with preference information which may be used a configuration instrument. As another example, when a card reader is linked to the preference interface, the card reader may be used to store preference information to a magnetic striped card which may be used as a preference instrument. The player may select their preferences and generate the configuration instrument without supply identification information or account information that may be used to identify the player.

The configuration instrument may be used to configure a gaming machine according to one or more preference selections made by the player. In some cases, the preference interface may automatically generate preference selections that may be added to the preference selections of the player. For example, the player may select a particular game that they may wish to play and the preference interface may select a bonus game, to go along with the particular game selected by the player, which a gaming establishment wishes to promote.

In other embodiments, preference account information may be accessed through a preference account interface displayed on a gaming machine such as gaming machines 102, 104 and 106 in casino 110 or gaming machines, 146 and 148 in store 140. In casino 110, the gaming machines 102, 104 and 106 are connected to the preference account server 101, which supports the preference account interface, via the local area network 108. In the store 140, the gaming machines 146 and 148 may connect to a local ISP 145 and the Internet 125 via some communication means 144 such as a modem connected to a communication line (e.g. phone or cable) and then communicate with the preference account server 101 via the preference account interface using an Internet connection. Again, the preference account interface may be used with a web browser although gaining machines of this invention are not limited to preference account interfaces using web access. When gaming machines, such as 146 and 148, are connected remotely to the preference account server over the Internet 125. A secure virtual private network may be used. Details of some embodiments of a virtual private network incorporating gaming machines are described with reference to U.S. application Ser. No. 09/732,650 entitled "Secured Virtual Network in a Gaming Environment" by Binh T. Nguyen which is incorporated herein by reference and for all purposes.

The firewall 107 may be hardware, software or combinations of both that prevent illegal access of the preference account server 101 and other devices connected to the preference account server 101, such as gaming machines 102, 104 and 106, by an outside entity. The firewall may be an external device such as 107, an internal device (see FIG. 3) or combinations thereof. An illegal access to the preference account server 101 may be an attempt to plant a program in the preference account server 101 that alters the operation of the server or allows someone to steal or illegally modify data. For example, a person may attempt to illegally redeem prizes from a loyalty point account or illegally add loyalty points to an account. The firewall may also be designed to prevent someone such as a hacker from gaining illegal access to the gaming machines connected to the preference account server 101 and tampering with them in some manner.

A game player using one of the gaming machines, 102, 104, 106, 146 or 148, may be able to view and modify preference account information using the preference account interface as previously described. As described above, the preference account information may be used to alter aspects of their game playing experience such as components of a video game presentation. Additional details of an interaction between a gaming machine 102, a kiosk 105 and a preference account server 101 are described with reference to FIG. 3.

Figure 3:
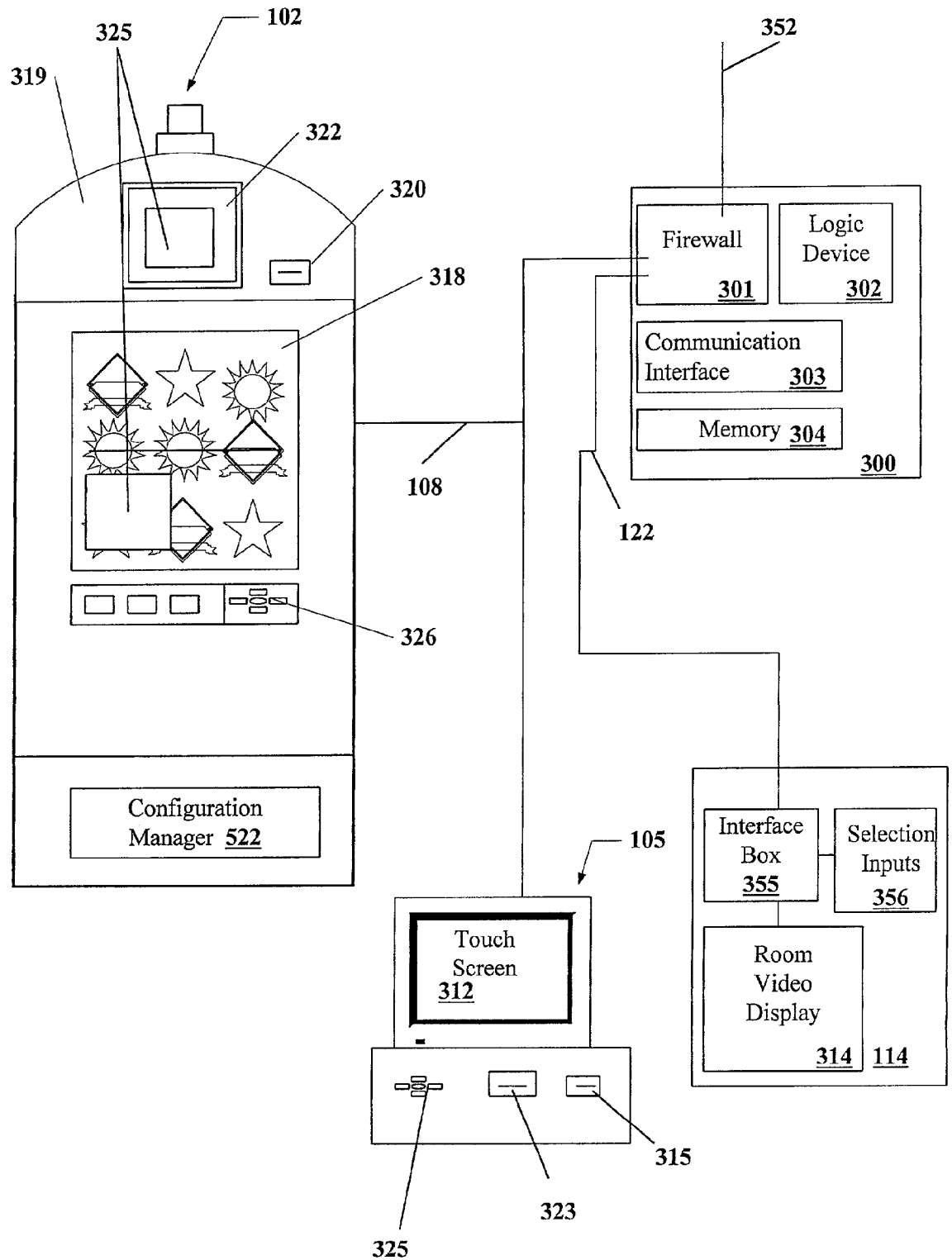
FIG. 3 is a block diagram of a preference account server connected to a gaming machine, kiosk and room display.

FIG. 3 is a block diagram of a preference account server 101 connected to a gaming machine 102, kiosk 105 and room access 114. A player may begin a game play session on the gaming machine 102 by entering identification information into the gaming machine 102 using an input interface of some type. The input interface may be a card reader 320, a video touch screen 318, selection inputs 326, a key pad, button pad, a mouse, a track ball, a touch pad, a joy stick, a wireless interface, a biometric input device and combinations thereof. The biometric input device may be one of but is not limited to a finger print reader, a retina scanner, a camera and a microphone.

Many different identification sequences are possible. For instance, a player may insert an account preference card into the card reader 320, which contains preference account information such as a player's name and an account. Next, the gaming machine 102 may request the player to enter additional identification information such as a numeric code or biometric information using an appropriate input device. The identification information entered during the identification sequence may be sent to the preference account server and compared with identification information stored on the preference account server. In another embodiment, the identification information may be compared with identification information stored on the account preference card entered into the card reader 320 without contacting the preference account server 101.

As another example of an identification sequence, the player may enter biometric information, such as a finger print pattern, using a finger print reader. The gaming machine may send the player's biometric information to the preference account server 101 or some other remote device. The preference account server 101 may receive the biometric information from the gaming machine 102 and determine the player's identity and preference account number. Next, the preference account sever 101 may send preference account information corresponding to a player's identity and account number to the gaming machine 102.

In the present invention, preference account information may be stored on a remote server such as a preference account server 101, a printed ticket, a card such as a magnetic striped card or a smart card, or on a storage device located on the gaming machine. Thus, after a player's identity has been established, the gaming machine 102 may retrieve a portion or all of the preference account information from one or more sources storing preference account information. For instance, the gaming machine 102 may retrieve preference account information from a preference account card inserted in the card reader 320. As another example, the gaming machine 102 may retrieve preference account information stored on the gaming machine 102. In yet another example, the gaming machine 102 may retrieve preference account information from the preference account server 101. In a further example, the gaming machine may retrieve preference account information from the preference account card inserted in the card reader 320 and from the preference account server 101.

The retrieval of preference account information by the gaming machine 102 may be influenced by one or more player inputs. The player inputs may be received by the gaming machine 102 using one or more input devices including but not limited to a video touch screen 318, a button panel 326, a track ball, a mouse, a microphone, a card reader, a joy stick, a touch pad, a wireless interface, a key pad and combinations thereof. For example, in some embodiments, the gaming machine may ask the player for a confirmation input before the gaming machine reconfigures itself according to preference account information stored in the player's preference account. When the confirmation input has been received by the gaming machine, the reconfiguration of the gaming machine using the preference account information may be performed by a configuration manager 522 (see FIG. 4 for more details of the configuration manager) on a master gaming controller (not shown) within the gaming machine 102. For instance, when the preference account information received by the gaming machine 102 includes a gaming machine volume setting, the volume of audio output on the gaming machine 102 may be readjusted. As another example, when the preference account information received by the gaming machine is for a preferred game, the gaming machine may load the preferred game from a storage device on the gaming machine or may download the preferred game from a remote game server.

In other embodiments, the gaming machine 102 may automatically reconfigure itself, using the configuration manager 522, according to preference account information stored in the player's preference account without the confirmation input by the player. In another example, the player may request to view or modify particular preference account information. In this case, the gaming machine may retrieve the requested preference account information from the source where it is located and display the requested preference account information using a preference account interface such as 325. The preference account interface may be displayed on a primary display such as 318 integrated into the main cabinet of the gaming machine 102 or a secondary display, such as 322, in a top box 319 mounted on top of the gaming machine 102.

The gaming machine 102 may receive a plurality of different requests for preference account information from a player where the preference account information contained in each request is different. The different preference account requests may occur during a single session of game play on the gaming machine 102. For instance, in a first request for preference account information, a player may wish to view a loyalty point account summary over a first period time covered by the loyalty point account. In the first request, the gaming machine 102 may retrieve the requested information from one or more sources storing preference account information and display it on a preference account interface such as 325. In a second request for preference account information in the same session, a player may wish to view a loyalty point summary over a second period of time different from the first period of time. The gaming machine may retrieve the requested information from one or more sources in the second request and display it on a preference account interface such as 325.

When the gaming machine 102 retrieves preference account information from the preference account server 101, the master gaming controller (not shown) that is designed or configured to control one or more games played on the gaming machine 102 may send a request to the remote server 101 using a communication interface within the gaming machine (not shown) connected to local area network 108. The request for one or more different portions of preference account information may be encapsulated in one or more messages of some type. The gaming machine 102 may also send messages to the preference account server 101 that include preference account information to be stored in the preference account server 102 or include commands for the preference account server 101 to execute. For instance, as described with reference to FIGS. 1A and 1B, when using the preference account interface, a player may request particular information (e.g. a help request) in regards to using the preference account interface. In other example, a player may request one or more modifications be made to their preference account information to be stored to the preference account server 101.

The preference account server 101 may receive the one or more messages via a communication interface 303 connected to a firewall 301. The messages may be received from a gaming machine, such as 102, a kiosk, such as 105 or a room access interface, such as 114. A logic device 302 within the preference account server 101 may be designed or configured to execute one or more software applications that allow preference account information to be input into a plurality of different preference accounts. In addition, the logic device may designed or configured to execute software applications that allows preference account information stored in a plurality of different preference accounts to be modified from an external device such as the gaming machine 102, the kiosk 105 or the room access interface 114. The preference account information may be stored on a memory 304 of some type located in the preference account server 101. For instance, the memory 304 may be a hard drive or some other appropriate storage medium. The communication interface 303 may connect to one or more local area networks, such as 108 or 122, and a wide area network 352 such as the Internet. At least one of the software applications executed by the logic device 302 may allow the preference account server 101 to simulate a game presentation for a plurality of games using a plurality of different preferred game features as described with reference to FIG. 1A. Another one of the software applications may allow the account preference server to generate one or more preference account interfaces. In some embodiments, the preference account interfaces generated by the preference account server 101 may be accessed via a web browser.

The preference account server 101 and preference account information stored on the preference account server may be accessed and modified via the kiosk 105 and the room access interface 114. For kiosk 105, a player may view and modify preference account information stored on the preference account server 101 using a touch screen, selection inputs 325 and a card reader 315. For room access interface 114, a player may view and modify preference account information stored on the preference account server 101 using an interface box 355 connected to selection input 356 and a room video display 314. For both the kiosk 105 and the room access interface 114, a player preference account interface may be displayed to a video display such as 312 and 314. Using kiosk 105, a user may print account preference account information using the printer 323. In addition, a player may store preference account information to a magnetic striped card or a smart card inserted into the card reader 315. Other input devices that may be used with a kiosk 105 or a room access interface 114 include but are not limited to a button panel, a track ball, a mouse, a microphone, a card reader, a joy stick, a touch pad, a wireless interface, a key pad and combinations thereof.

Figure 4:
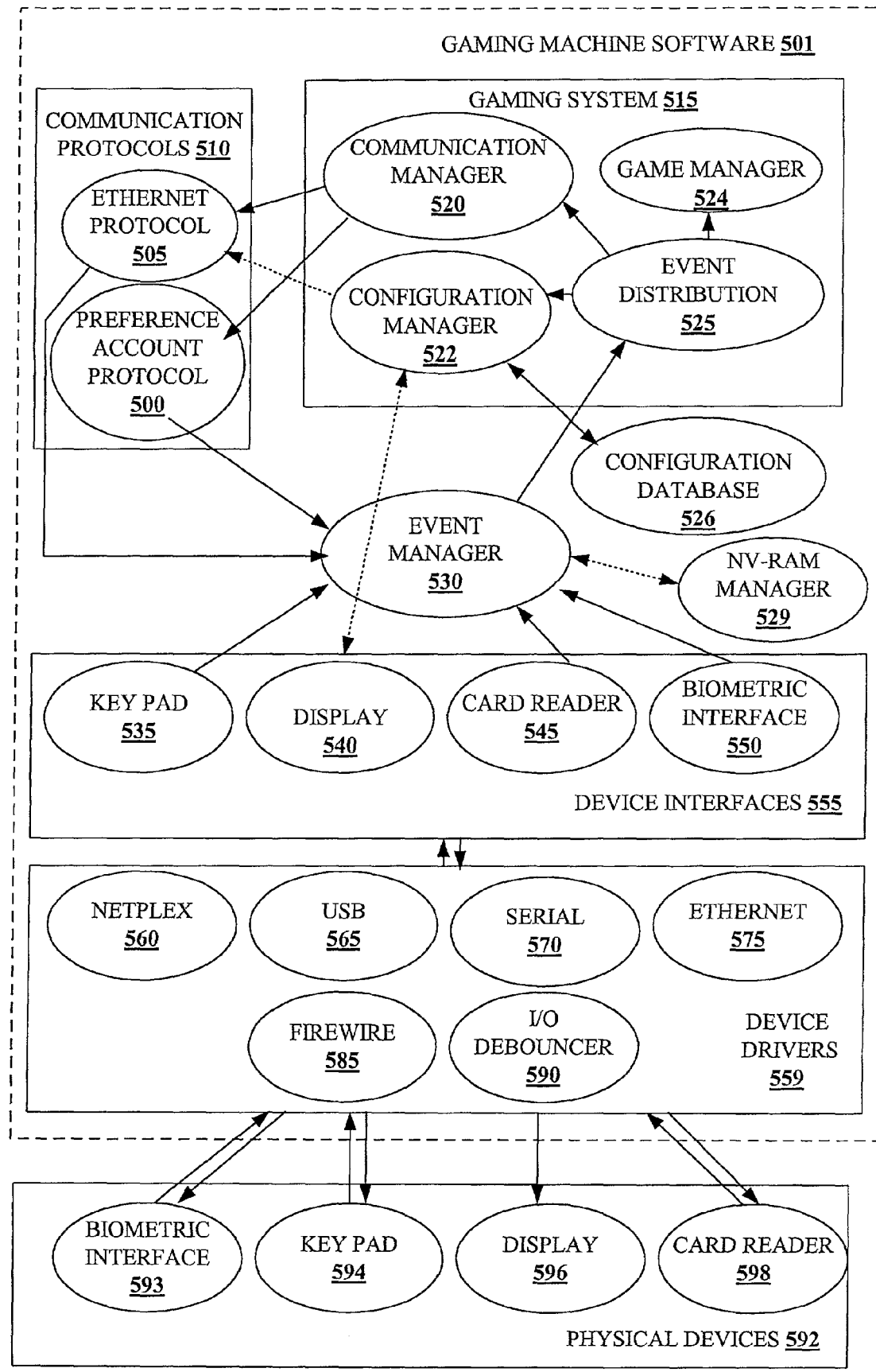
FIG. 4 is a block diagram depicting a software architecture for a gaming machine providing preference account services.

FIG. 4 is a block diagram of a gaming machine software architecture 501 allowing a gaming machine to be reconfigured to implement various player preferences for one embodiment of the present invention. Various hardware and software architectures may be used to implement this invention and are not limited to the architecture described with respect to FIG. 4. The gaming machine software 501 is connected to the physical devices 592 which may be used to obtain preference account information, to obtain account identification information, to display preference account interfaces and provide preference account services. The software player tracking units may be loaded into the memory of the master gaming controller at the time of initialization of the gaming machine.

The main parts of the gaming machine software 501 are communications protocols 510, a gaming system 515, an event manager 530, device interfaces 555, and device drivers 559. The device drivers 559 communicate directly with the physical devices including a biometric interface 593 (e.g. a finger printer reader, retina scanner, camera, etc.), a key pad 594, a display 596, a card reader 598 or any other physical devices that may be used to provide preference account services and other related gaming services.

The device drivers 559 utilize a communication protocol of some type that enable communication with a particular physical device. The device driver abstracts the hardware implementation of a device. For example, a device driver may be written for each type of card reader that may be potentially connected to the gaming machine. Examples of communication protocols used to implement the device driven 559 include Netplex 560, USB 565, Serial 570, Ethernet 575, Firewire 585, I/O debouncer 590, direct memory map, serial, PCI 580 or parallel. Netplex is a proprietary IGT standard while the others are open standards. For example, USB is a standard serial communication methodology used in the personal computer industry. USB Communication protocol standards ace determined by the USB-LF, Portland, Oreg.

The device drivers may vary depending on the manufacturer of a particular physical device. For example, a card reader 598 from a first manufacturer may utilize Netplex 560 as a device driver while a card reader 598 from a second manufacturer may utilize a serial protocol 570. Typically, only one physical device of a given type is installed into the gaming machine at a particular time (e.g. one card reader). However, device drivers for different card readers or other physical devices of the same type, which vary from manufacturer to manufacturer, may be stored in memory on the gaming machine. When a physical device is replaced, an appropriate device driver for the device is loaded from a memory location on the gaming machine allowing the gaming machine to communicate with the device uniformly.

The device interfaces 555, including a key pad 535, a display 540, a card reader 545, and a biometric interface 550, are software units that provide an interface between the device drivers and the gaming system 515. The device interfaces 555 may receive commands from the software configuration 522 requesting an operation for one of the physical devices. As an example, the configuration manager 522 may send a series of commands to the display interface 540 that allows a preference account interface of some type be displayed on the display 596. The dashed arrow from the configuration manager 522 to the device interfaces 555 indicates a command being sent from the configuration manager 522 to the device interfaces 555. The display interface 540 sends the one or more commands or messages to the device driver for the display 596. The device driver for the display communicates the commands and messages to the display 596 allowing the display 596 to display the preference account interface.

The device interfaces 555 may also receive preference account events from the physical devices. The device driver can poll a device routinely for input or preferably is notified via an interrupt signal. The solid black arrows indicate event message paths between the various software units. For example, when a card containing preference account information is inserted into the card reader 598, the card reader device interface 545 receives a message via one of the device drivers 559 indicating the card has been inserted into the card reader 598, i.e. a "card-in" message. When using the interrupt method, the message is sent directly to the card reader device interface 545. When using the polling method, the message is sent in response to a query by the card reader device interface such as "has a card been inserted?" Typically, the device drivers 559 do not perform any high level event handling. As another example, when a player places their finger on a platen of a finger print reader for identification purposes, the biometric interface 550 receives a message via one of the device drivers 559 indicating an object has be placed over the finger print reader i.e. a "platen covered," message.

Typically, a preference account event and other events generated by the gaming machine software 501 are an encapsulated information packet of some type posted by the device interface. The preference account event is created when input is detected by one of the device interfaces 555. The events are distributed through a queued delivery system which is described below in more detail in the U.S. application Ser. No. 09/642,192 by LeMay et al., entitled, "Gaming Machine Virtual Player Tracking and Related Services," which is incorporated herein in its entirety and for all purposes. In addition, further details of the gaming machine software 501 are described in the LeMay, et al., reference. Each event contains a standard header with additional information attached to the header. The additional information is typically used in some manner at the destination. For example, the "card-in" event may contain preference account information such as a player's preference account number which may be received by the configuration manager 522 and sent to a preference account server outside of the gaming machine.

Once a device interface 555 has received a player tracking event or some other event from a physical device 592, the event is posted to the event manager 530. The event manager 530 is typically a shared resource that is utilized by all of the software applications in the gaming system 515 including the configuration manger 522, a game manager 524 and a communication manager 520. The event manager 530 evaluates each event to determine whether the event contains critical information that is protected from power hits on the gaming machine. Events containing critical information may be sent to the non-volatile memory manager 529 for storage in non-volatile memory. The non-volatile memory manager 529 may also be shared by other applications.

The source of an event, which may be a device interface 555 or a server outside of the gaming machine, is not usually directly connected to the event destination. Thus, the event manager 530 acts as an interface between the event source and the one or more event destinations. After the source posts the event, the source returns back to performing its intended function. For example, the source may be a device interface polling a hardware device. The event manager 530 processes the event posted by the source and places the event in one or more queues for delivery.

After an event is received by the event manager 530, the event may be sent to event distribution 525 in the gaming system 515. Event distribution 525 broadcasts the event to the software units that may operate on the event. For example, when a player enters an identification code using the key pad 594, this event may arrive at the configuration manager 522 after the event has passed through the device drivers 559, the key pad device interface 535, the event manager 530, and the event distribution 525. After receiving an event, the configuration manager 530 evaluates the event and determines whether a response is required to the event. Thus, one function of configuration manger may be as a preference account event evaluator. In response to an event, the software configuration manager unit may 1) generate a new event and post it to the event manager 530, 2) send a command to the device interfaces 555, 3) send a command or information to a preference account communication protocol 500 or an Ethernet protocol so that the information may be sent outside of the gaming machine, 4) do nothing or 5) perform combinations of 1), 2) and 3).

When an event is distributed, it may be distributed to a plurality of software units within the gaming machine system 515 as well as software units located outside of the gaming machine for evaluation. For example, when a preference account event occurs it may be sent to the configuration manager unit 522 which evaluates the event and in parallel the event may be sent to the communication manager 520 which sends the events to the communication protocol software 510, including the Ethernet protocol or the preference account protocol 500. Using an appropriate communication protocol, the preference account event may be sent to a preference account server located outside of the gaming machine so that the event may be evaluated by a preference account software unit located on the preference account server.

The communication protocols typically translate information from one communication format to another communication format. For example, a gaming machine may utilize one communication format while a server providing preference account services may utilize a second communication format. The preference account protocol 500 translates the preference account information from one communication format to another allowing information to be sent and received from the server. Additionally, the preference account server, located outside of the gaming machine, may send events via the preference account protocol 500 which are sent to the event manager 530. For instance, the preference account server may send one or messages containing preference account information relating to gaming machine setting and game feature settings as events to the event manager 530. In one embodiment of the present invention, the preference account information may be sent to the gaming machine by the preference account server in response to a request for preference account information generated by the configuration manager 522. The configuration manager 522 may receive the one or more event messages from the preference account via the event manager 530 and the event distribution 522. The event messages may contain preference account information.

The preference account information received from the preference account server may be used by the configuration manager 522 to reconfigure the gaming machine according to one or more player preferences. For instance, when the player preference is a volume setting on the gaming machine, the configuration manger 522 may adjust the audio output setting on the gaming machine that are used by the game manager 524. In another example, the configuration manager 522 may adjust a game feature setting such as a background color scheme for a typical game used by the game manager 524. Game feature settings for different games corresponding to a plurality of game feature selections selected by a player may be stored in a configuration database 526 on the gaming machine. In some embodiments, an external device to the gaming machine may store the configuration database 526 and download configuration information to the gaming machine.

Figure 5:
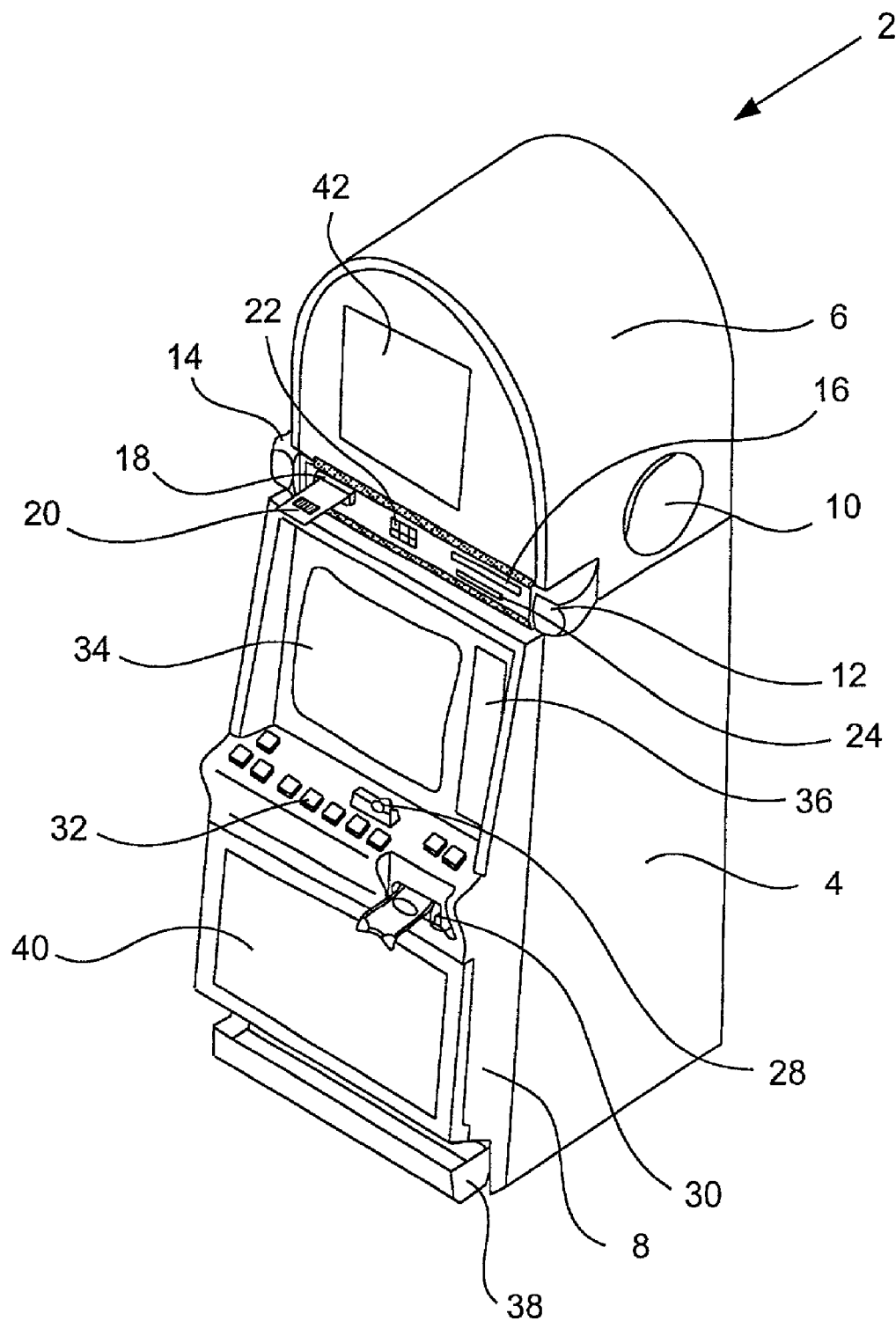
FIG. 5 is a perspective drawing of one embodiment of a gaming machine of the present invention.

Turning to FIG. 5, a video gaming machine 2 of the present invention is shown. Machine 2 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor and may include touch screen capabilities. The gaming machine may include a secondary display 42 with touch screen capabilities. The information panel 36 may be a backlit, silk screened glass panel with lettering to indicate general game information including, for example, the number of coins played. The bill validator 30, player-input switches 32, video display monitor 34, and information panel are devices used to play a game on the game machine 2. The devices are controlled by circuitry such as the master gaming controller (not shown) housed inside the main cabinet 4 of the machine 2. Many possible games, including traditional slot games, video slot games, video poker, video pachinko, video blackjack, video card games and video keno, may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information or preference account information, a florescent display 16 for displaying player tracking information or preference account information and a card reader 24 for entering a magnetic striped card containing player tracking information. Further, the top box 6 may house different or additional devices than shown in the FIG. 5. For example, the top box may contain a bonus wheel, a secondary video display or a back-lit silk screened panel which may be used to add bonus features to the game being played on the gaming machine. During a game, these devices are controlled and powered, in part, by circuitry such as the master gaming controller (not shown) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Those of skill in the art will understand that the present invention, as described below, can be deployed on most any gaming machine now available or hereafter developed.

Returning to the example of FIG. 5, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit. During the game, the player typically views game information and game play using the video display 34. The player may also access a preference account interface using the video display 34.

Prior to initiating game play, the player may enter preference account information using the card reader 24, the keypad 22, and the florescent display 16. As another example, the player may enter preference account information using the card reader 24 and the video display 34 where the video display may be used as a touch screen to enter preference account information such as player identification information. In yet another example, the player may enter preference account information using a microphone (not shown). The master gaming controller may include speech recognition software that allows the microphone to be used as part of a speech recognition interface for selecting preferences on the gaming machine. In some embodiments (see FIGS. 9-12), the player may not need to provide any identification information, a pin-number or any account information that allows them to be identified. Additional identification information from the player may be obtained from one or more biometric input devices (not shown) such as a finger print reader, a retina scanner or a camera. The camera may be used with feature recognition software on the gaming machine or a remote server to identify the player.

After a player has been identified, using one or more input devices a player may view and/or modify preference account information via the preference account interface displayed on the video display 34. In addition, the gaming machine may reconfigure itself according to a number of player preferences. The player preferences may be incorporated as part of a game play on the gaming machine.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. Certain player choices may be captured by preference account software loaded in a memory inside of the gaming machine. For example, when a betting preference has not been specified by the player, the betting preferences of a player during a game play session may be captured by the preference account software. The information captured by the preference account software may be used to modify a player's preference account information according to game play preferences exhibited by the player during one or more game play sessions.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. In some embodiments, a player may be able to select preferred video and audio effects that are incorporated into a game presentation as described with reference to FIGS. 1A and 1B. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 2. In some embodiments, these tickets may be used by a game player to obtain game services.

Figure 6:
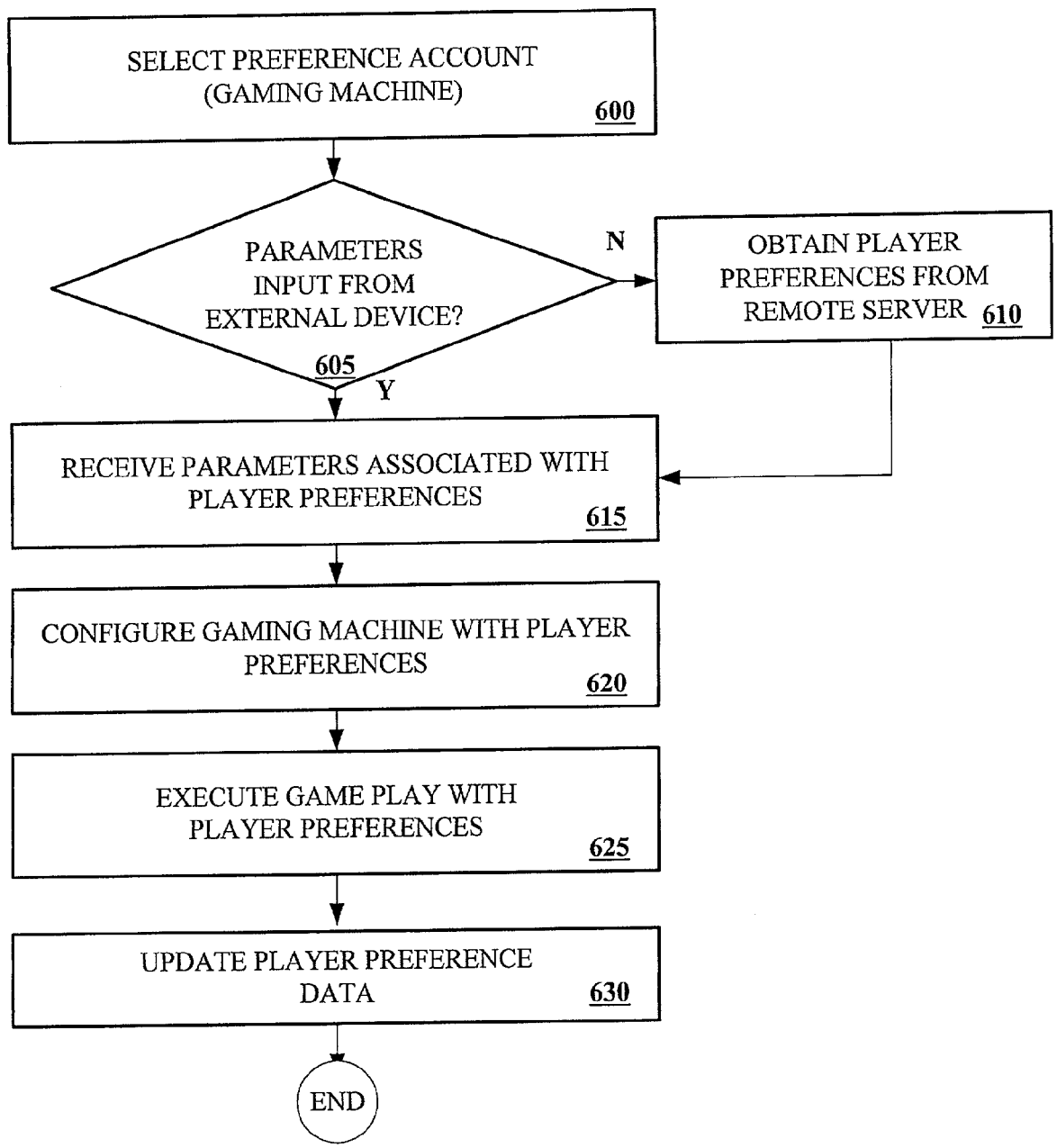
FIG. 6 is a flow chart depicting an implementation of a preference account methodology on a gaming machine for one embodiment of the present invention.

FIG. 6 is a flow chart depicting an implementation of a preference account methodology on a gaming machine for one embodiment of the present invention. In 600, the gaming machine selects a preference account. After receiving a request to access a preference account, the selection of the preference account and authentication of the request may be based upon player identification information entered by the player into the gaming machine in some manner. For instance, player identification information may be entered as a alpha-numeric code entered into the gaming machine, biometric information entered into the gaming machine or combinations thereof. In 605, the gaming machine may determine whether preference account information used to reconfigure the gaming machine was received from an external device such as from a smart card inserted into a card reader on the gaming machine or from another input device (e.g. a touch screen) connected to the gaming machine. The preference account information may include but is not limited to loyalty point information, loyalty point account settings, promotional opportunities, preferred games, preferred game features for the preferred games, preferred gaming machine settings, preferred bonus games and preferred progressive games as described with reference to FIGS. 1A and 1B. In 610, when the gaming machine is connected to a remote preference account server, the gaming machine may send a request for a portion of preference account information from the remote preference account server and receive the requested preference account information from the remote server. In some embodiments, during a single game play sequence by the same player, the gaming machine may make multiple requests to the remote server requesting different portions of the preference account information stored on the remote server.

In 615, the gaming machine may receive preference account information describing one or more selected player preferences from an external device, a remote server or combinations thereof. In 620, the gaming machine may reconfigure itself according to the selected player preferences described in the preference account information. For instance, a level of audio output on the gaming machine may be adjusted according to a preferred volume setting selected by the player, a preferred bonus game may be loaded into a memory on the gaming machine for execution during game play and the gaming machine may be configured to a preferred game denomination selected by the player such as 0.07 US dollars. In 625, a game play on the gaming machine may be executed with the player preferences.

In 630, player preference account data may be updated. For instance, during a game play session on the gaming machine where a player plays a series of games, preference account software on the gaming machine may record one or more characteristics of the player's game play during the game play session such as the amount wagered on each game or the speed at which the player plays a game. The characteristics may be used to update preference account information for the player. For example, the rate at which a player plays the game may be used to adjust a game presentation speed on the gaming machine stored in a player's preference account. Thus, the update of the preference account information may occur without a direct input by the player. In another example, a player may request to view and modify preference account information using a preference account interface displayed on the gaming machine in some manner. After modification of the preference account information, the information may be stored to an external storage unit such as a smart card, a magnetic striped card, a paper print-out, a remote server, a personal digital assistant and combinations thereof.

Figure 7:
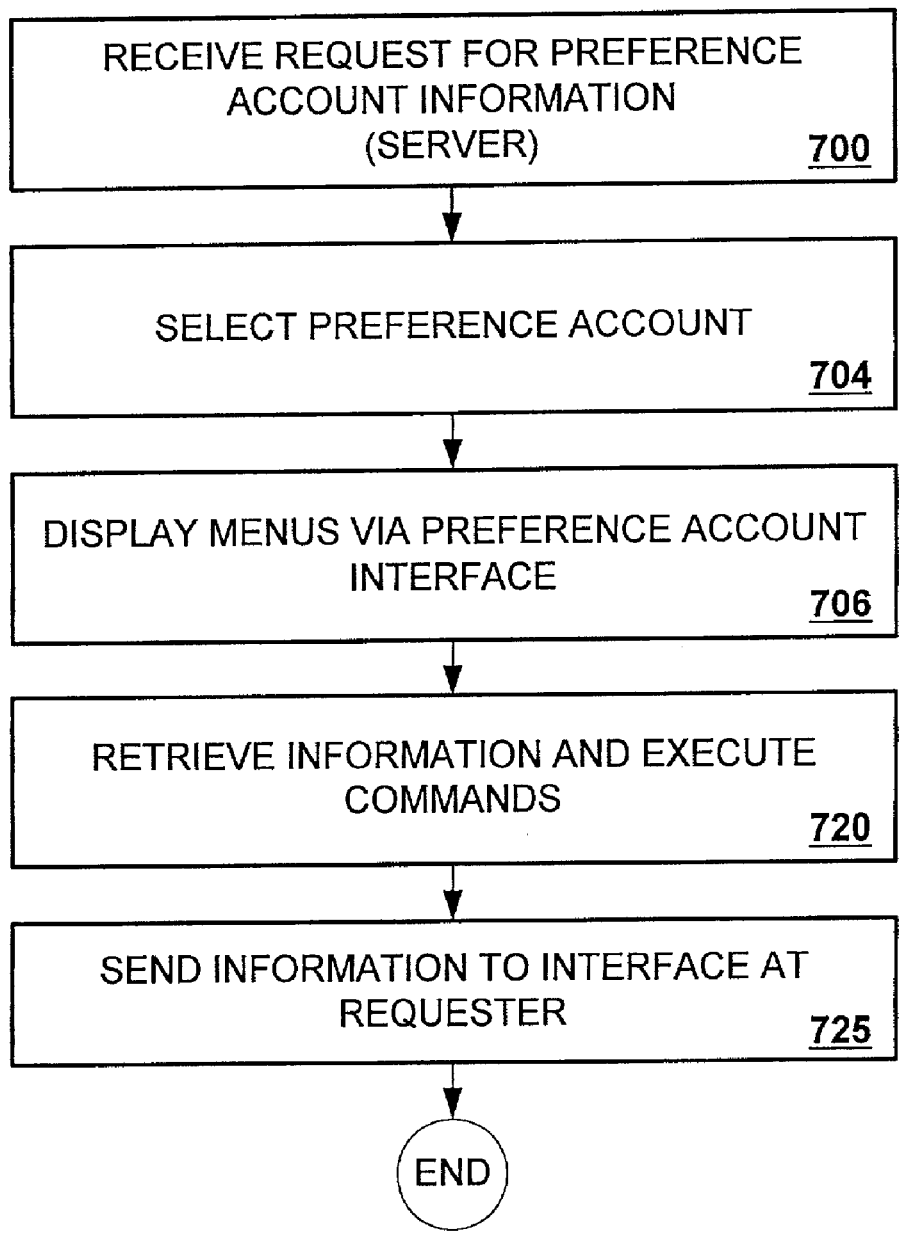
FIG. 7 is a flow chart depicting an implementation of a preference account methodology on a preference account server for one embodiment of the present invention.

FIG. 7 is a flow chart depicting an implementation of a preference account methodology on a preference account server for one embodiment of the present invention. In 700, a preference account server, which may be a device separate from a gaming machine or a gaming machine with server capabilities, may receive a request for preference account information. The request for preference account information may be made from a number of different devices external to the preference account server such as a gaming machine, a home computer, a casino kiosk, a personal digital assistant, a phone and a video display interface. In some embodiments, the video display interface may be located in a hotel room or a restaurant.

In 704, the preference account server may select a particular preference account using player identification information supplied to the preference account server by the requesting external device. The identification information may include but is not limited to biometric information, alpha-numeric input codes, a player's name, a player's account number and combinations thereof. The player identification information may be used to authenticate the request for preference account information.

In 706, one or more menus may be displayed to a preference account interface used by the external device by the preference account server. The menus may allow a user of the preference account interface to view and modify preference account information stored on the preference account server. In some embodiments, the preference account interface may be accessed via a web browser.

In 720, the preference account server may retrieve preference account information and execute commands operating on preference account information that are available through the one or more preference account interfaces (e.g. see FIGS. 1A and 1B). For instance, the commands may allow a user of the preference account interface to add, delete and store preference account information on the preference account server. As another example, a user of the interface may be able to simulate one or more game presentations, including audio and video effects, from one or more games such as video poker games, video slot games, video blackjack games, video pachinko games, video card games and video games of chance. The game presentations may be modified according to one or more preference options selected by the player. The game presentations simulated via the interface may allow a player to assess how various selected preference options will affect their game playing experience.

In 725, the preference account server may send the requested preference account information to the external device requesting the preference account information. For instance, the requested information may be a summary of a player's loyalty point account over a certain time period. While the player is using the preference account interface hosted by the preference account server, a player may make multiple requests for preference account information via the preference account interface. Thus, 700, 704, 706, 720 and 725 may repeated a plurality of times by the same player during a single session of using the interface, over multiple different sessions by the same player and over multiple sessions by different players. A single session may defined as the time period between when a user is granted access to a preference account, such as by entering player identification information, and when a player's access to the preference account is terminated. Thus, a second subsequent session to a first session begins after a player's access has been terminated in the first session and a new access to a player, which may be the same or a different player than in the first session, has been granted in the second session.

Figure 8:
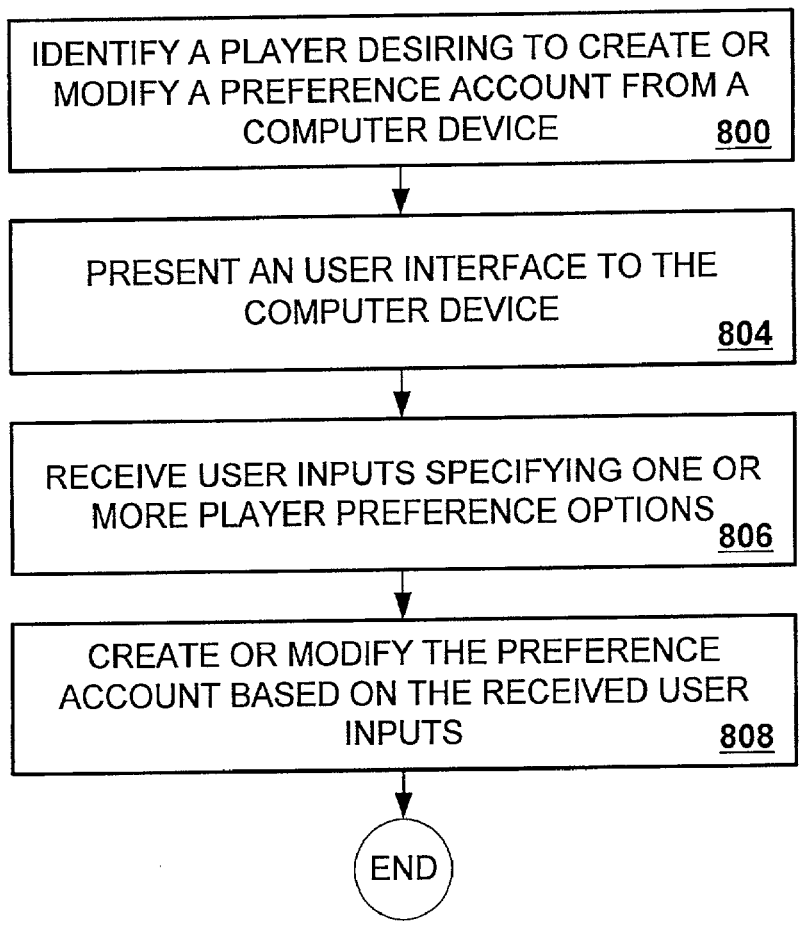
FIG. 8 is a flow chart depicting a method of creating or modifying a preference account.

FIG. 8 is a flow chart depicting a method of creating or modifying a preference account. In some embodiments, the preference account and preference account interfaces may be hosted by a remote device, external to a group of gaming machines, such as a preference account server. In other embodiments, preference accounts and preference account interfaces may be hosted by a gaming machine with preference account server capabilities. In 800, a player desiring to create or modify a preference account stored from a computer device may be identified. The player may be identified by information that the player inputs into the computer device using an input device of some type such as a biometric input device. The computer device may be a gaming machine, a home computer, a casino kiosk, a personal digital assistant, a phone or a video display interface. Thus, a particular preference account may be potentially accessed from many different types of devices at many different locations.

In 804, a preference account user interface may be presented on the computer device. The preference account interface may be used to display and receive preference account information. The preference account information may include but is not limited to loyalty point information, loyalty point account settings, promotional opportunities, preferred games, preferred game features for the preferred games, preferred gaming machine settings, preferred bonus games and preferred progressive games as described with reference to FIGS. 1A and 1B. In some embodiments, the preference account interface and preference account information may be accessed via a web browser.

In 806, via one or more preference account interfaces hosted on one of the computer devices, the preference account server may receive user inputs specifying one or more player preference options that are available to a player through their preference account. The user inputs may modify previously specified preference account options or in the case of a new account specify preference account options for the first time. In some embodiments, new preference accounts may be created with preference account information pre-specified according to one or more templates. The templates may be based upon a player's game playing habits obtained from other sources such as player tracking or may be based upon an analysis of game playing habits of one or more demographic groups such as age, income, gender, etc. The preferences of one or more demographic groups which a player fit into may used to generate an initial preference account template for the player.

When the preference account information is pre-specified, a player modifying their preference account for the first time may modify information already generated from a preference account template. In 808, the preference account server may create a new preference account or modify the preference account based upon the received user inputs and store it in a memory for archival purposes and later retrieval. In addition, the preference account server may simulate a game presentation using preference account information specified by the user.

Figure 9:
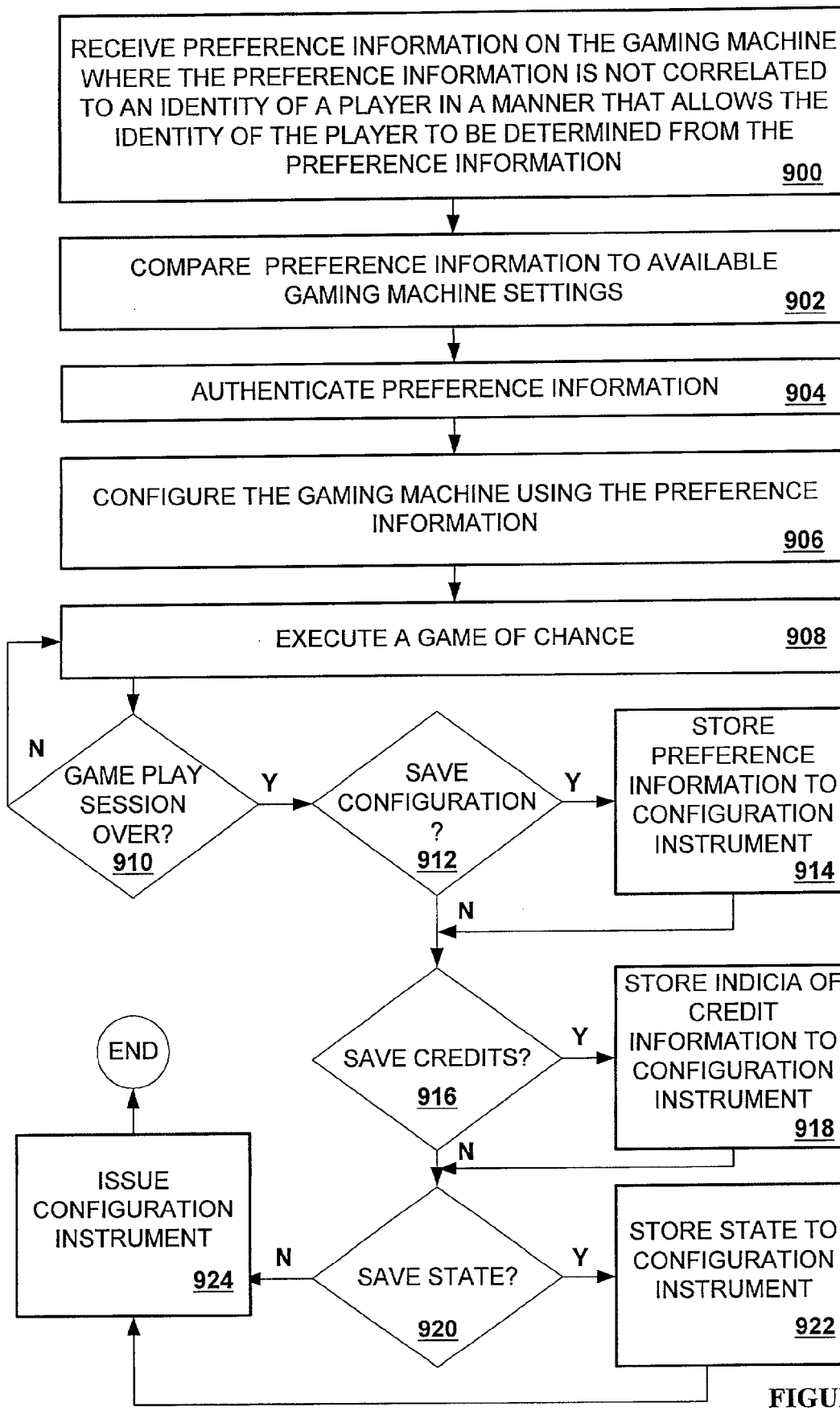
FIG. 9 is a flow chart depicting a method of configuring a gaming machine according to one or more preferences.

FIG. 9 is a flow chart depicting a method of configuring a gaming machine according to one or more preferences without requiring a game player to reveal their identity. This anonymous configuration method does not require the use of a preference account where the player may view and modify player preferences stored in the player's preference account as preference account information. In the preference account method, the preference account information is correlated to an identity of the player. Therefore, to access the preference account and to configure a gaming machine using the preference account information stored in the preference account server, the player is required to supply identification information. In the anonymous configuration method to be described below, in one embodiment, a configuration instrument may be used to configure a plurality of gaming machines using preference information selected by the player that is stored on the configuration instrument. Details of some types of preference information that a player may select are described with respect to FIG. 1A.

The preference information in the anonymous configuration method is not correlated to the identity of the player. Thus, the player may utilize the configuration instrument to configure the plurality of gaming machines while remaining anonymous. In general, the gaming machine may be configured in one or more of the follow ways: 1) without receiving a player tracking card from a game player participating in the game play, 2) without receiving identification information from a user participating in the game play, 3) without accessing a player tracking account of a user participating in the game play and 4) without accessing a remote server connected to the gaming machine.

In 900, the gaming machine may receive the preference information from at least one of a configuration instrument designed to store preference information, such as a cashless ticket voucher, ii) a display interface on the gaming machine, iii) a remote server, iv) a speech recognition interface on the gaming machine and v) combinations thereof. Configuration instruments, a configuration system that allows configuration instruments to be validated and methods of validating configuration instruments are described with respect to FIGS. 10 and 11. An example of a cashless ticket voucher that may be used with the present invention is described with respect to FIG. 12. An example of a display interface for selecting preferences was described with respect to FIG. 1A. Remote servers that may be used with the present inventions are described with respect to FIG. 3. A speech recognition interface that may be used with the present invention is described with respect to FIG. 5.

The preference information used to configure the gaming machine may be selected by the player, selected by a gaming establishment, generated by the gaming machine and combinations thereof. In one embodiment, the remote server may download preference information selected by a gaming establishment where the gaming machine is located. The gaming establishment preferences may differ from the player preferences. For instance, the gaming establishment may download preference information to the gaming machine to configure the gaming machine in a manner that may or may not be desirable to game players playing the gaming machine. When the player does not like the configuration of the gaming machine, the player may be able to change the configuration using a touch screen interface, a speech recognition interface on the gaming machine or other input devices. When the player likes the preferences selected by the gaming establishment, the player may be able to save the preference information selected by the gaming establishment to a configuration instrument in 914 and use the configuration instrument to configure another gaming machine.

In another embodiment, the gaming machine may generate preference information based upon how the player plays one or more games on the gaming machine. For example, if the player uses a particular betting pattern during their game play, the gaming machine may determine the pattern and save it as preference information. The gaming machine may even prompt the player and ask them if they would like to try a particular gaming machine setting or a particular gaming machine feature. When the player likes the preferences selected by the gaming machine, the player may be able to save the preference information generated by the gaming machine to a configuration instrument in 914 and use the configuration instrument to configure another gaming machine with the saved information.

Some examples of preference information that may be selected by the player or gaming establishment and received by the gaming machine in 900, include but are not limited to preferred games, preferred bonus games, preferred game features and preferred gaming machine settings. The preferred gaming features for the preferred games may be selected from the group consisting of game versions, game color schemes, game graphical features, a game presentation speed, game paytables and game audio features. The preferred gaming machine settings may be selected from the group consisting of a volume setting, an input interface configuration, a display setting, a denomination setting, a betting preference settings, a language setting and a beverage setting.

When the gaming machine reads preference information from a configuration instrument, the configuration instrument may be selected from the group consisting of a printed ticket, a cell phone, a magnetic striped-card, a smart card, an optical scan sheet, a media printed with preference information, a cell phone and a hand-held computing device. To read the information from the different types of configuration instrument, the gaming machine may include one or more of a ticket reader, a bar-code reader, a card reader, a wire-less interface, a bill validator, an optical scan sheet reader, a text scanner and a smart card reader. The gaming machine may display information read from a configuration instrument or input by other means to a video display screen on the gaming machine. For example, after the gaming machine receives the preference information, the gaming machine may display the received preference information to the video display screen and ask the player to confirm whether they want the gaming machine configured according to the displayed information. The video display screen may be a main display or a secondary display on the gaming machine (See FIG. 5).

In 902, the gaming machine may compare preference information received from a configuration instrument with functions available on the gaming machine. The functions available on a gaming machine may vary from gaming machine to gaming machine. For instance, a first gaming machine may provide a first set of games, bonus games, game features and gaming machine settings that may be configured with a configuration instrument and a second gaming machine may provide a second set of games, bonus games, game features and gaming machine settings different than the first set that may be configured with the configuration instrument. Therefore, a configuration instrument storing preference information may be issued at the first gaming machine.

Then, the configuration instrument may be utilized at the second gaming machine. However, the second gaming machine may not be able to configure itself according to the preference information stored on the configuration instrument because the functions available on the first and second gaming machines are different. In this case, the second gaming machine may display which functions can be configured using the preference information stored on the configuration instrument. When the preference information is received via the display interface on the gaming machine, the speech recognition interface on the gaming machine or from the remote server, the functions on the gaming machine may have already been taken into consideration and 902 may not be necessary. For example, the display interface on the gaming machine may only display selections that are available for modification on the gaming machine.

In 904, the information read from the configuration instrument may be authenticated. When the preference information is received via the display interface on the gaming machine, the speech recognition interface on the gaming machine or from the remote server, authentication of the preference information may not be necessary. For the display interface and the speech recognition interface, authentication may not be necessary because the interfaces may be designed to receive a limited set of information and security safeguards may be built into the interfaces to prevent tampering or fraud. Similarly, for the communications from the remote server, authentication may not be necessary because the communication between the gaming machine and the remote server may include sufficient safeguards such as encryption to prevent tampering.

The configuration instrument may be designed to store authentication information used to authenticate the configuration instrument where the authentication information is selected from the group consisting of a bar code, an instrument type, an issue date, a validation number, an issue time, an instrument number, an instrument sequence number, a gaming machine identification number and biometric information. When the configuration instrument is issued, the authentication information stored on the configuration instrument may also be stored on another device such as a remote server (see FIG. 10 and FIG. 11 for more details).

For example, when a first gaming machine issues a configuration instrument, the information stored on the configuration instrument, such as but not limited to the authentication information, preference information and indicia of credit information used to add credits to the gaming machine, may be stored on the first gaming machine, the remote server or another gaming device. When the configuration instrument issued at the first gaming machine is used at the first gaming machine at a later time or when the configuration instrument is used at a second gaming machine, the gaming device (e.g., the first gaming machine or the remote server) storing a copy of at least a portion of the information stored on the configuration instrument may be contacted and the information read from the configuration instrument may be compared with the information stored on the gaming device to authenticate the information.

When the information stored on the configuration instrument matches the copy of the information stored the configuration instrument, the configuration instrument and its stored information may be considered authenticated. When the information stored on the configuration instrument does not match the copy of the information stored the configuration instrument, the configuration instrument may be considered non-authentic. When it is determined the configuration instrument is non-authentic, the configuration of the gaming machine using the preference information received from the configuration instrument may be blocked and the configuration of the gaming machine using other information received from the configuration instrument, such as indicia of credit information may be blocked.

In one embodiment, the remote device containing the copy of the information stored on the configuration instrument may send a copy of its stored information to the gaming machine. Upon receiving the copy of information from the remote device, the gaming machine may compare the copy of the information with the information read from the configuration instrument and determine whether to carry out a transaction using information from the configuration instrument. The transaction may be but is not limited to 1) configuring the gaming machine and 2) adding credits to the gaming machine. In another embodiment, the gaming machine may send information read from the configuration instrument to the remote device (see FIG. 11) and request the remote device to determine whether to carry out a transaction using information from the configuration instrument. The remote device may send a reply message to the gaming machine approving or rejecting the requested transaction. The remote device may reject a requested transaction for number a reasons including but not limited to: 1) the remote device can not find a record matching the information stored on the configuration instrument, 2) the information stored on the configuration instrument does not match the information stored on the remote device (e.g., the configuration instrument is counterfeit or the configuration instrument has been corrupted), 3) a transaction involving the configuration is currently pending (See FIGS. 10 and 11), 4) the configuration instrument has expired or has been voided for some reason, and 5) the configuration instrument has already been used and additional transactions using the configuration instrument are not allowed.

In some embodiments, authentication of the configuration instrument may not be required. For example, when the configuration instrument is used only to configure the gaming machine, it may not be necessary to authenticate the preference information. When authentication of the configuration is not required, a copy of the information stored on the configuration may not be stored. Although, the gaming machine may still expect the information stored on the configuration instrument to be in a particular format even though authentication of the information is not required. When the configuration instrument is used to add credits to the gaming machine or used for a transaction involving credits, then the configuration instrument is authenticated.

In 906, the gaming machine may configure itself according to the preference information stored on the configuration instrument. For example, the gaming machine may configure itself to display textual information in a language specified on the configuration instrument. In another example, the gaming machine may load a version of a game and a version of a bonus game specified by the configuration instrument. In yet another example, the gaming machine may configure itself with a betting pattern and a betting denomination specified by the preference information on the configuration instrument.

Other examples of preference information are described with respect to FIGS. 1A and 1B. In FIGS. 1A and 1B, the preferences used to configure a gaming machine are referred to as preference account information because the preferences are stored in a preference account, such as a player tracking club account, where the preferences are correlated to an identity of a player. In the method described with respect to FIG. 9, the preferences are not correlated to the identity of a player and are referred to as preference information. Thus, preference account information and preference information may be used to specify the same preferences.

In some embodiments, to configure itself, the gaming machine may load one or more software modules from a memory device on the gaming machine. For instance, when a game specified by the preference information is different than a game currently loaded on the gaming machine, then the gaming machine may load one or more software modules from the memory device to allow the game specified by the preference information to be played on the gaming machine. In another embodiment, one or more software modules needed by the gaming machine to configure itself may be located on a remote file storage device. Therefore, the gaming machine may initiate a download process to transfer the needed software from the remote file storage device to the gaming machine. For instance, the gaming machine may download software modules used to play a game of chance preferred by a player from a remote file storage device. Details of types of software modules that may be downloaded to a gaming machine and details of methods for downloading software modules to a gaming machine from a file storage device are described in co-pending U.S. applications, application Ser. No. 09/925,098, filed on Aug. 8, 2001, by Cockerille, et al, and titled "Process Verification," and Application no. 10/040,239, filed on Jan. 1, 2002, by Lemay, et al., and titled "Game Development Architecture that Decouples the Game Logic from the Graphics Logic," which are both incorporated herein in their entirety and for all purposes.

In yet another embodiment, the gaming machine may load credits stored on the configuration instrument. The credits loaded onto the gaming machine from the configuration instrument may be "cashable" credits or "promotional" credits. The cashable credits may be used to play a game of chance or may be cashed out for their monetary value. The promotional credits may be used to play the game of chance but may not be cashed out for their monetary value. Although, the promotional credits may be used to win awards in the game of chance that may be cashed out for their monetary value.

In a further embodiment, the configuration instrument may be used to configure the gaming machine according to a particular game state in a game of chance or a bonus of game of chance. In gaming, a bonus game played with a game of chance may use game events from multiple plays of the game of chance. As the player plays the game of chance, game events may occur that are tracked by the bonus game. When a tracked game event or a combination of tracked gaming events has occurred one or more times, the player may win an award in the bonus game. The tracked game event may simply be initiating a new game of chance, such as a slot game. As another example, in a slot game, the tracked game event may be to a particular combination of symbols in the slot game. Some examples of bonus games that may provide awards using game events from multiple plays of the game of chance are described in U.S. Pat. No. 6,135,884, issued Oct. 24, 2000, by Hedrick et al. and titled, "Gaming Machine Having Secondary Display For Providing Video Content," which is incorporated herein in its entirety and for all purposes.

Typically, the bonus games described above end when the player finishes playing the game of chance and leaves the gaming machine. When the player leaves the gaming machine, the state in the bonus game played by the player, such as the number of times a particular game event has occurred, is lost. The next time the player plays the bonus game, the player must start the bonus game from the beginning. With the present invention, a state in the bonus game played by the player may be stored on the configuration instrument. Therefore, the player may leave the gaming machine on which they began play of the bonus game and then return to the same gaming machine or return to a different gaming machine and use the configuration instrument to restore the bonus game to the state it was when they left in 906. In one embodiment, the player may be given a configuration instrument as a promotion that allows them to start a bonus game at a state that is advanced from an initial state of the bonus game. For example, if a game event tracked by the bonus game is a number of games played and the initial state of the bonus game is zero games played, then the configuration instrument may be used to initiate the bonus game to a state corresponding to a plurality games of game played.

The present invention is not limited to bonus games. For any game of chance that tracks game events over multiple games or a game of chance that requires a significant period of time to complete, the configuration instrument may be used to store a state in the game that can be restored using the configuration instrument. In one embodiment, the present invention may be applied to table games. For example, in a black jack table game, a bonus game may be designed that provides a player an award after certain number of game events, such as when a particular combination of cards, occurs a number of times. The configuration instrument may be used with a gaming device at the blackjack table to store the player's state in the bonus game and to configure the gaming device using the state of the game stored in the configuration instrument.

In 908, the gaming machine may execute a game of chance, which may comprise a plurality bonus games, using a configuration specified by the configuration instrument. In 910, after the game of chance has been completed and when the game play session is not over, the gaming machine may continue to execute games of chance. In 912, when the game play session is over, the player may be provided an opportunity to save preference information used during the game play session to a configuration instrument.

In one embodiment, the preference information may be saved automatically by the gaming machine without input from the player. The player may not even be aware that preference information was saved to the configuration instrument. In another embodiment, the gaming machine may generate a display interface that lists all of the preference information used during the game play session. The player may be able to save all of the preference information that was used during the game play session or a subset of the preference information that was used during the game play session using the display interface.

The preference information saved to the configuration instrument may have been selected by the game player, by a gaming establishment that maintains the gaming machine and combinations thereof. In one embodiment, a game play session may be executed on the gaming machine and configuration instrument may be generated without receiving preference information during the game play session from the game player. In this instance, the configuration instrument may store preference information that was received from a remote server or preference information that was generated by the gaming machine based upon the game play session and combinations thereof. For example, the gaming machine may determine a betting configuration used by the game player during the game play session, such as a denomination, a number of paylines and a number credits per payline used in a slot game, and automatically store this information as preference information on a configuration instrument. The next time the player uses the configuration information in the same gaming machine or a different gaming machine, the gaming machine may configure itself using the preference information. In another embodiment, the gaming machine may determine a betting configuration used by the game player during the game play session and ask the player using a display interface whether they desire to save the preference information to a configuration instrument.

With the methods described above, the preference information used by the player may vary with time. For instance, initially the player may play engage in a game play session on a gaming machine where the game play session is initiated without the use of a configuration instrument. At the end of the game play session, the gaming machine may suggest preference information that may be selected by the game player. The game player may select the information suggested by the gaming machine and the gaming machine may issue a printed ticket storing the preference information selected by the player. The player may use the printed ticket to configure a second gaming machine. While engaging in a game play session at the second gaming machine, the player may select additional preference information. The preference information generated at the first gaming machine may be combined with the preference information generated at the second gaming machine and stored to a configuration instrument.

The method may also comprise generating a second configuration instrument at the gaming machine where the second configuration instrument is a generated using a printer and a printable media and issued to the player. The second configuration instrument, which may be a printed ticket, magnetic striped card or another type of configuration instrument, may store preference information that is stored on the first configuration instrument, preference information that is input using the display interface, preference information received from the remote server, preference information generated by the gaming machine, preference information input using the speech recognition interface and combinations thereof. In addition, the method may comprise one or more of a) storing indicia of credit information to the second configuration instrument where the indicia of credit information may be used to add credits to the gaming machine, b) configuring a second gaming machine using the second configuration instrument, and c) adding credits used for a game play on a second gaming machine using the second configuration instrument.

In 914, preference information selected by the player and/or selected by the gaming machine is stored to the configuration instrument. In 916, when the credits are remaining on the gaming machine, the player may be provided with the option of saving all of the credits or a portion of the credits to a configuration instrument. In some embodiments, the credits may be automatically stored to the configuration instrument. In 918, indicia of credit information and information used to redeem the credits stored on the configuration instrument are stored to the configuration instrument.

In 920, the player may be provided the option to save state information from i) a state of game played on the gaming machine, ii) a state of a bonus game played on the gaming machine and iii) combinations thereof. In some embodiments, the state information may be automatically saved to the configuration instrument. The state information may be used to configure a game and/or bonus game played on the gaming machine to a particular state in the game. In 922, state information is saved to the configuration instrument. In 924, the configuration instrument is issued to the player.

When modification performed on the configuration instrument are complete and the player takes the configuration instrument into their possession, the configuration instrument may be considered issued to the player. For instance, a printed ticket voucher may be considered issued when the player removes the printed ticket from the gaming machine. As another example, when a transfer of configuration information is sent via a wireless interface to a configuration instrument that is carried by the player where the configuration information is used to modify the configuration instrument to perform a transaction, the configuration instrument may be considered issued when the transfer of information has been completed. In yet another example, when a transfer of information is sent via a smart card interface, such as a card reader, to a smart card where the smart card is used to modify the smart card to perform a transaction, the smart card may be considered issued when the transfer of information has been completed and the player removes the smart card from the card reader.

Figure 10:
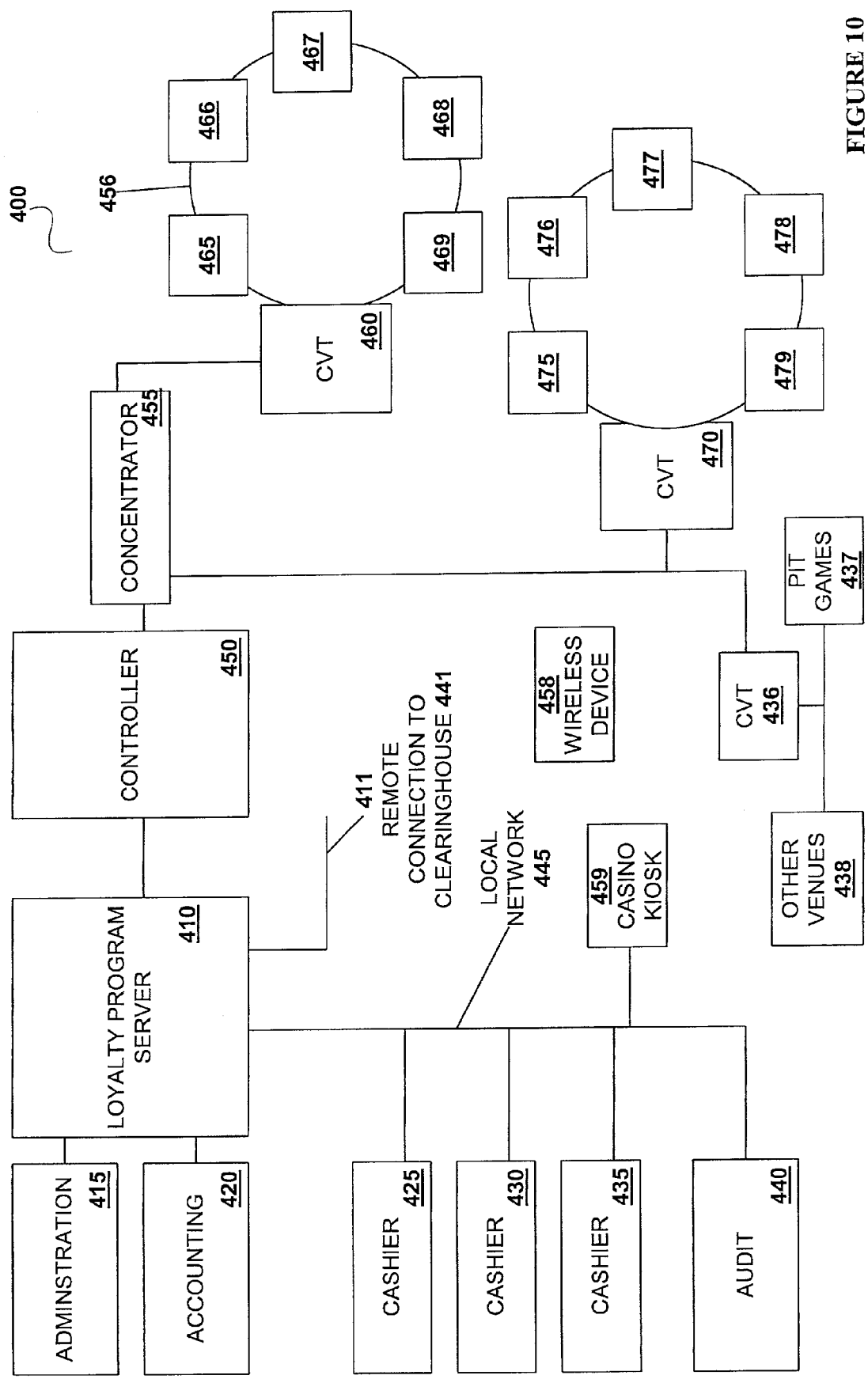
FIG. 10 is a block diagram of the components of a configuration instrument system for one embodiment of the present invention.

FIG. 10 is a block diagram of the components of a configuration instrument system for one embodiment of the present invention. A configuration instrument system is the hardware components and software components needed to generate and validate configuration instruments. As described above, the configuration instrument may store preference information that is used to configure a gaming machine. Components of an configuration instrument system may include 1) data acquisition hardware, 2) data storage hardware, 3) configuration instrument generation and validation hardware (e.g. printers, card readers, ticket acceptors, validation terminals, etc.), 3) auditing software, 4) configuration instrument validation software and 5) database software. Many types of configuration instrument systems are possible and are not limited to the components listed above.

A configuration instrument system may be installed at a plurality of gaming establishment utilizing configuration instruments. The configuration instruments may be issued at one gaming establishment and used at another gaming establishment. To allow multi-site validations of configuration instruments, the configuration instruments systems at each property may be linked to a configuration instrument transaction clearinghouse. The details of the generation and the validation of configuration instruments using a configuration instrument system at one property and multiple properties are described below with reference to FIG. 10.

In some embodiments of the present invention, the configuration instrument system may be implemented as part of a cashless system that generates cashless instruments. A cashless instrument is a media, such as but not limited to a smart card, a printed ticket, a magnetic striped card, a room key, a cell phone, a hand-held computing device and a portable wireless device that may be used to store information that allows it to be used as an indicia of credit at least a gaming establishment. An example of a cashless system that may be modified to implement cashless instruments with preference information and the functions of a configuration instrument that are described with respect to FIG. 10 is the EZPAY™ system manufactured by IGT of Reno, Nev. As described with respect to FIG. 10, the configuration instrument is a media, such as but not limited to a smart card, a printed ticket, a magnetic striped card, a room key, a cell phone, a hand-held computing device and a portable wireless device that may be used to store at least preference information that allows a gaming device to be configured according to one or more preferences.

Figure 12:
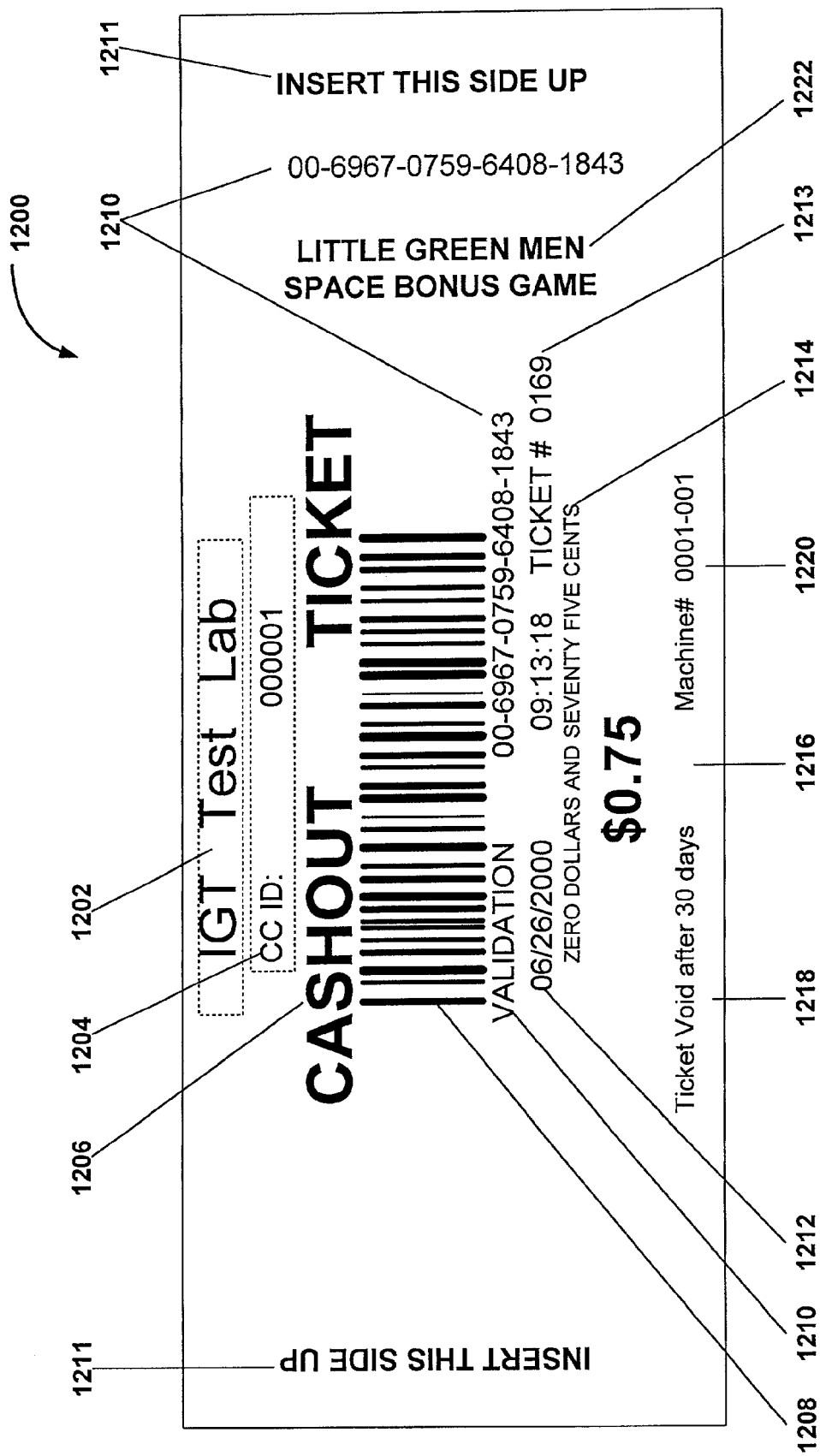
FIG. 12 is a block diagram of a printed ticket that may be used as a configuration instrument of the present invention.

The cashless system may be adapted to support configuration instruments and cashless instruments in a number of different ways. In one embodiment, the cashless system is used with both configuration instruments and cashless instruments but the functions of the configuration instruments and the cashless instruments may be separate. For instance, configuration instruments may store preference information used to configure gaming devices but not store indicia of credit information allowing it to be used as an indicia of credit. The cashless instrument may be store information that allows it to be used as an indicia of credit but not preference information that allows it to be used as a configuration instrument. In this case, cashless system may recognize both instruments but the format of each of the configuration instrument and the cashless instrument may differ. In another embodiment, a single instrument may be used to perform the functions of both a cashless instrument and a configuration instrument. In FIG. 12, an example of a printed ticket that may be used as both a cashless instrument and a configuration instrument is described.

A configuration system may be designed to work with a plurality of different types configuration instruments at the same time, such as but not limited to smart cards, printed tickets, magnetic striped cards, room keys, cell phones, handheld computing devices and portable wireless devices. For instance, one configuration system may be designed to work with configuration instruments that are magnetic striped cards and printed tickets. Another configuration system may be designed to work with printed tickets and portable wireless devices. Different devices in the configuration system may accept different types of configuration instruments. For instance, a first gaming machine may accept smart cards, magnetic striped cards and printed tickets while a second gaming machine may accept only printed tickets.

Details of apparatus and methods used to validate a cashless instruments and that may be applied to the validation of a configuration instruments are described in co-pending U.S. application Ser. No. 09/544,884 by Rowe et al. filed Apr. 7, 2000 entitled "Wireless Gaming Environment" which is incorporated herein in its entirety and for all purposes. Details of apparatus and methods used to validate a cashless instrument across multiple gaming properties and may be applied to the validation of a configuration instrument across multiple gaming properties are described in co-pending U.S. application Ser. No. 09/684,382 by Rowe filed Aug. 25, 2000 entitled "Cashless Transaction Clearinghouse" which is incorporated herein in its entirety and for all purposes. Details of apparatus and methods of using a smart card as a cashless instrument, at a single gaming property or across multiple gaming properties, that may be applied to the use of a smart card as a configuration instrument, at a single gaming property or across multiple gaming properties, are described in co-pending U.S. application Ser. No. 09/718,974 by Rowe filed Nov. 22, 2000 entitled "EZPAY™ Smart Card and Ticket System" which is incorporated herein in its entirety and for all purposes. Details of providing secure transactions for a cashless system which may applied to a configuration instrument system are described in co-pending U.S. application Ser. No. 09/660,984 by Espin et al. filed Sep. 13, 2000 entitled "Transaction Signature" which is incorporated herein in its entirety and for all purposes.

A configuration instrument may be issued by storing information to the configuration instrument and within the configuration system that allows it to be used as a configuration instrument. For example, when a smart card is used a configuration instrument, a gaming machine may issue the configuration instrument by storing information to the smart card and by storing information to other devices in the configuration system. In the example of a printed ticket used as a configuration instrument, the gaming machine may print information on the ticket and then may send a copy of the information to another device in the configuration system.

Since the configuration instrument may have a "cash value", it may be important to prevent fraud, such as validating a single ticket multiple times or validating a duplicate copy of an already validated ticket, and to provide accounting means for tracking unvalidated and validated tickets. Further, even when the configuration instrument does not have a "cash value," a gaming establishment may wish to track its usage and limit the number of times it may used. To prevent fraud and to provide accounting for configuration instruments, generation sites and validation sites for configuration instruments, such as but not limited gaming machines, casino kiosks, cashier stations, clerk validation terminals, pit games and wireless gaming devices, may 1) when a configuration instrument is issued at a generation site, store transaction information to both the configuration instrument and to a memory location separate from the configuration instrument and 2) when a configuration instrument is validated, transaction information stored on the configuration instrument may be compared with transaction information previously stored at the memory location.

Returning to FIG. 10, a first group of gaming machines 465, 466, 467, 468, and 469 is shown connected to a first clerk validation terminal (CVT) 460 and a second group of gaming machines, 475, 476, 477, 478 and 479 is shown connected to a second CVT 470. The clerk validation terminals are used to store transaction information generated when a configuration instrument is issued at a generation site such as a gaming machine. The transaction information, which may be stored each time a configuration instrument is issued, may include but is not limited to preference information, an establishment, a location, a bar code, a instrument type (e.g. ticket, smart card, room key, magnetic card, portable wireless device, etc.), an issue date, a validation number, an issue time, an instrument number, an instrument sequence number and a machine number. Also, the transaction information may include transaction status information such as whether the configuration instrument has been validated, is outstanding or has expired. Some of the transaction information stored in the CVT may also be stored on the configuration instrument as preference information. When a configuration instrument is authenticated, the information stored in the CVT and the information stored on the configuration instrument may be compared as a means of providing secure transactions.

When a gaming establishment is not interested in tracking and validating the use of the configuration instruments, a validation process and associated hardware/software may not be needed. For example, in one embodiment, configuration instruments may be used with a group of stand-alone gaming machines. The stand-alone gaming machine may issue configuration instruments and accept configuration instruments that may be used within the group of gaming machines without being networked to the other gaming machines in the group or without being connected to a configuration system. Therefore, a first stand-alone gaming machine may simply issue a configuration instrument that may be used to configure the first gaming machine at a later time or to configure a second stand-alone gaming machine that accepts the configuration instrument issued by the first gaming machine.

In one embodiment of the present invention, a clerk validation terminal (CVT), such as 436, 460 and 470, may be connected to a number of gaming devices that generate configuration instruments and the CVT may store transaction information each time a configuration instrument is generated by one of the gaming devices, connected to the CVTs, issues a configuration instrument. For instant, CVT 460 is connected to gaming machines, 465, 466, 467, 468 and 469 in ring 456. The gaming machines 465, 466, 467, 468 and 469 may issue printed tickets as a configuration instrument. Each time one of the gaming machines issues a printed ticket, transaction information describing the transaction may be stored to the CVT and printed on the ticket.

In one embodiment, when the CVTs are not connected to one another or the gaming machines are not linked together in some manner, a configuration instrument from one gaming machine may be only be accepted in another gaming machine which is in a group of gaming machines connected to the same clerk validation terminal. For example, a configuration instrument issued from gaming machine 465 might be accepted at gaming machines 466, 467, 468 and 469, which are each connected to the CVT 460, but not in gaming machines 475, 476, 477, 478, and 479, which are each connected to the CVT 470. In an analogous manner, when the configurations systems (or cashless systems adapted to accept configuration instruments), from one property are not connected together then a configuration instrument generated from gaming machine 466 may be not be used at property different from property 400.

The CVTs, 436, 460 and 470, store transaction information corresponding to the outstanding configuration instruments, including ticket vouchers, smart cards and debit cards, that are waiting for redemption. Outstanding configuration instruments are configuration instruments that have been at least issued by a gaming device to perform a function, such as to configure a gaming machine and/or add credits to a gaming machine, and that have been recorded in the configuration system. The redemption of the configuration instrument is when the configuration instrument is used for one or more of the functions for which it was issued.

In some embodiments, the configuration instrument may not be used for all of its functions. For instance, configuration instrument may be issued with preference information that specifies a configuration of a gaming machine and an indicia of credit information that allows credits to be added to a gaming machine. The configuration instrument may be inserted into a gaming machine and the player may simply wish to configure the gaming machine without using the credits. In another example, the configuration may be inserted into a gaming machine that can not be configured in the manner specified by the configuration but the player may still add the credits on the configuration instrument to the gaming machine.

The CVTs may transaction information. In this embodiment, the CVTs are separate from the gaming machine. However, the transaction information may be also be stored within each gaming machine or one gaming machine may functionally act as a CVT for a group of gaming machines eliminating the need for separate CVT hardware. In addition, transaction information may be stored in a configuration server 410. As previously described, the configuration server may be an EZ PAY™ server that also supports cashless instrument transactions.

As described above, the transaction information may be used when the configuration instruments are validated, such as to configure a gaming machine. The CVTs 436, 460 and 470 may store the information for configuration instruments issued by the gaming machines connected to the CVT. For example, CVT 460 may store ticket voucher information for ticket vouchers printed by gaming machines 465, 466, 467, 468, and 469. When a configuration instrument is issued, the transaction information may be sent to the CVT using a communication protocol used by the gaming machine. For example, the gaming machine may send transaction information to the CVT which is part of the cashless system using the slot data system manufactured by Bally's Gaming Systems (Alliance Gaming Corporation, Las Vegas, Nev.) or the slot acquisition system manufacture by IGT, Reno, Nev.

In present invention, when a player wishes to redeem a printed ticket or a configuration instrument of some other type, the player may redeem vouchers printed from a particular gaming machine at the CVT associated with the gaming machine or any other CVT which is part of the configuration instrument system associated with the CVT. For example, when CVT 460 and CVT 470 are connected as part of a single cashless system to the EZ pay server 410 where the cashless system is used with configuration instruments, a player may utilize configuration instruments at the gaming machines, the CVT's (436, 460 or 470), the cashiers (425, 430 and 435), the casino kiosk 459, the other venues 438 or the wireless cashiers 458. The cashiers, 425, 430, 435 and 458, may be used to redeem a cash value stored on the configuration instrument. To redeem the configuration instrument for cash or to utilize for another purpose, the configuration instrument may be validated by comparing information obtained from the instrument with information stored within the CVT or other gaming devices which behaves functionally as a CVT. After the configuration instrument has been redeemed for cash, the CVT marks the instrument paid in a database to prevent an instrument with similar information from being cashed multiple times.

In some embodiments, the configuration instrument may only be used to configure a gaming machine one time or a limited number of the times. The validation process may be used to limit a number of times a configuration instrument can be used for a particular function. When a configuration instrument may be used for a plurality of functions, the limits on each function may be tracked individually. For example, a printed ticket may be issued that can be used to configure a gaming machine twice and can be redeemed for cash or credits on a gaming machine once. Therefore, the printed ticket may be used to add credits to a first gaming machine and configure the first gaming machine with preference information stored on the ticket. After the credits are validated on the gaming machine by the configuration system, the printed ticket may be returned to the player and the player may use the printed ticket to configure a second gaming machine but not to add credits to the second gaming machine. When the limits on each function of the configuration have been reached, the configuration system may no longer validate the ticket.

Again, not all configuration systems may utilize CVTs, many of the functions of the CVT may be transferred to the cashless server, including the configuration instrument server 410, eliminating the transferred function within the CVT. For instance, the transaction information may be stored in the configuration instrument server 410 instead of the CVTs. Thus, the need to store transaction information within the CVT may be eliminated.

In this embodiment, multiple groups of gaming machines connected to CVTs, such as 455 and 470, and other gaming devices in the other venues 438 and the pit games 437 connected to CVT 436 are linked together in a cross validation network 445. The cross validation network is typically comprised of one or more concentrators 455 which accepts inputs from two or more CVTs and enables communications to and from the two or more CVTs using one communication line. The concentrator 455 is connected to a front end controller 450 which may poll the CVTs transaction information. The front end controller 450 is connected to a configuration instrument server 410 which may provide a variety of information services for the configuration instrument system including accounting 420 and administration 415. The accounting system may be used to track configuration settings used on the gaming machine in the configuration system. The configuration settings information may be valuable to the gaming establishment because it may enable the gaming establishment to determine which gaming features are most preferred by the anonymous players.

In this invention, the configuration server is a hardware and a software platform allowing configuration instruments to be utilized at all of the configuration instrument validation sites (e.g. cashier stations, gaming machines, wireless cashiers and CVTs) within the single property 400. Server hardware was described with respect to FIG. 3 in regards to a preference account server may also be adapted for use in a configuration instrument server. The configuration instrument server 410 may also be used to provide multi-site validation of configuration instruments via a connection 411 such as a network interface to a remote transaction clearinghouse. The configuration instrument server 410 may be a communication nexus in a cross validation network. The cross validation network allows configuration instruments generated by any gaming machine connected to the cross validation network to be accepted by other gaming machines in the cross validation network 445. The cross validation network may span multiple gaming establishments. Thus, to validate the configuration instrument, the configuration instrument server 410 may have to communicate with the transaction clearinghouse 441 via the remote connection 411 to obtain the information necessary to validate the instrument.

As configuration instruments are validated, this information may be sent to audit services computer 440 providing audit services, the accounting computer 420 providing accounting services or the administration computer 415 providing administration services. In another embodiment, all of these services may be provided by the configuration server 410 which may also be an EZPAY™ server. Examples of auditing services, which may be provided by configuration system software residing on the auditing computer 440 include 1) session reconciliation reports, 2) soft count reports, 3) soft count verification reports, 4) soft count exception reports, 5) machine instrument status reports and 5) security access report. Examples of accounting services, which may be provided by cashless system software residing on the accounting computer 420 include a) instrument issuance reports, b) instrument liability reports, expired instrument reports, c) expired instrument validation reports, d) instrument redemption reports and e) gaming machine configuration reports. Examples of administration services, which may be provided by the configuration system software residing on the administration computer 415 include but are not limited to i) manual configuration instrument receipts, ii) manual configuration instrument reports, iii) configuration instrument validation reports, iv) interim validation reports, v) validation window closer reports, vi) voided configuration instrument receipts and vii) voided configuration instrument reports.

Figure 11:
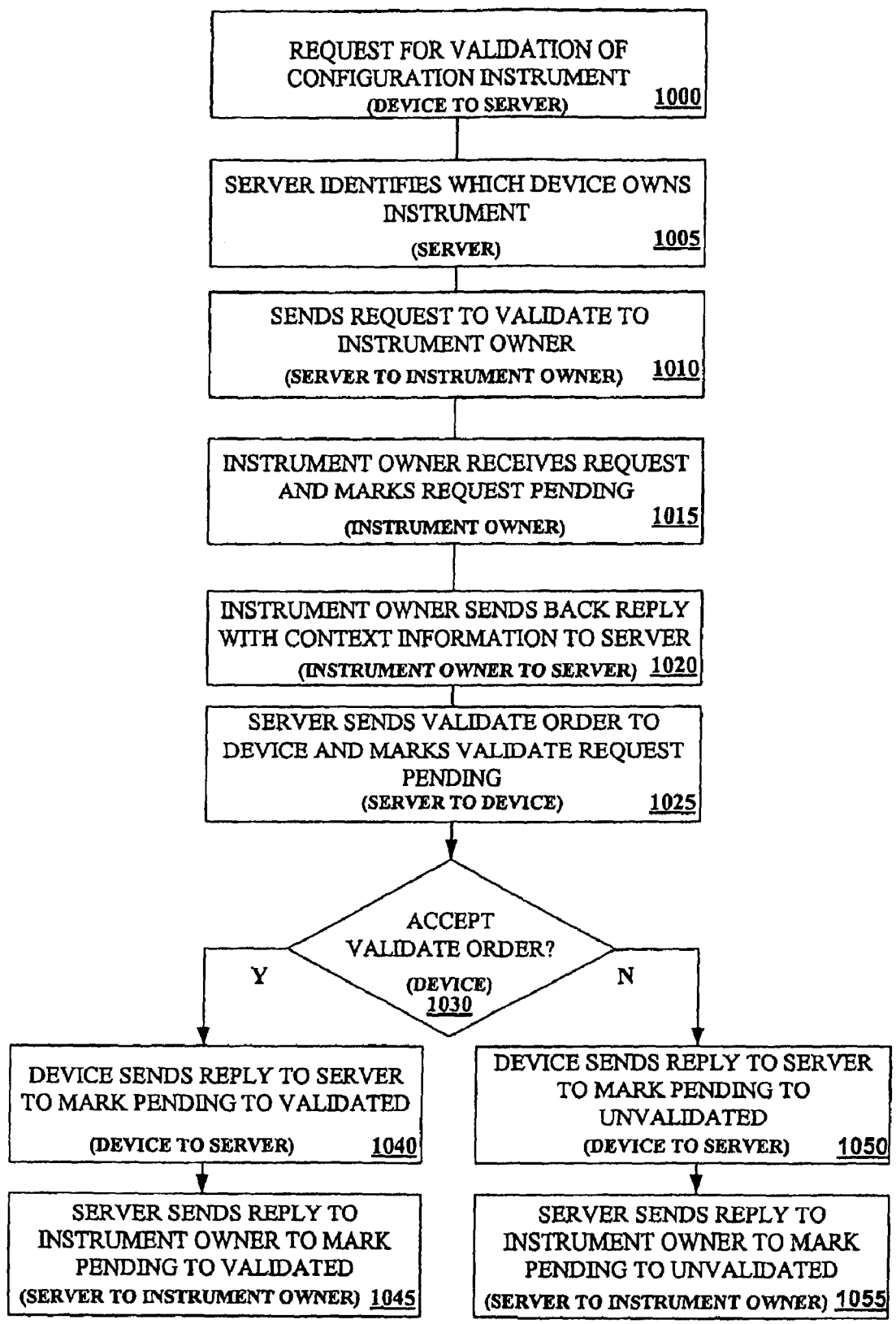
FIG. 11 is a flow chart depicting a method for validating information stored on a configuration instrument at a validation site connected to a cross validation network as described with reference to FIG. 10.

FIG. 11 is a flow chart depicting a method for validating information stored on a configuration instrument at a validation site connected to a cross validation network as described with reference to FIG. 10. In the embodiment shown in the figure, a configuration instrument is validated in a manner consistent with an EZPAY™ cashless system. In 1000, a request for transaction information read from a configuration instrument is sent via a network interface on the gaming device validating the instrument to a configuration instrument server. The gaming device may be but is not limited to a gaming machine, a casino kiosk, a hand-held wireless device (e.g., personal digital assistant, cell phone) or a CVT. In 1005, the server identifies which gaming device owns the instrument. When a gaming device owns an instrument, the gaming device has stored information regarding the status of a particular instrument issued from an instrument generation site connected to the gaming device. As an example, as described with reference to FIG. 10, the gaming device may be a CVT connected to a number of gaming machines that generate configuration instruments. In 1010, the server sends a request to validate the instrument to the gaming device identified as the owner of the instrument. Typically, the validation request indicates a service on the instrument has been requested. For instance, for a configuration instrument ticket, a validation request may mean a request to configure a gaming machine using preference information on the ticket has been made. For a configuration instrument ticket valid for promotional credits, a validation request may mean a request to obtain the credits has been made. In 1015, the instrument owner receives the validation request for the instrument and marks the instrument transaction pending. While the instrument transaction is pending, any attempts to validate a configuration instrument with similar information is blocked by the instrument owner.

In 1020, the instrument owner sends back a reply with context information to the server. As an example, the context information may be the time and place when the instrument was issued. The information from the instrument owner to the server may be sent as one or more data packets according to a communication protocol, such as TCP/IP, shared by the instrument owner and server. In 1025, after receiving the validation reply from the instrument owner, the server marks the validation request pending and sends a validation order to the gaming device validating the instrument. While the validation request is pending, the server will not allow another instrument with the same information as the instrument with the validation request pending to be validated.

In 1030, the gaming device may chose to accept or reject the validation order from the server. For instance, using a security protocol, the gaming device may determine the validation order is invalid. As another example, an employee using a gaming device to validate configuration instruments may decide not to validate an instrument for some reason. When the gaming device accepts the validation order from the server, in 1040, the gaming device sends a reply to the server confirming that the transaction has been performed. The server marks the request validated or completed which prevents another instrument with identical information from being validated. As described with respect to FIG. 10, a configuration instrument may be issued with multiple functions. Thus, a function on the instrument may be validated which prevents another instrument with identical information from being used for the validated function but allows other functions on the instrument not validated to be used in the future. In 1045, the server sends a confirmation to the instrument owner which allows the instrument owner to mark the request from pending to validated. When the gaming device rejects the validation order from the server, in 1050, the gaming device sends a reply to the server to mark the validation request from pending to unvalidated. When the instrument transaction is marked unvalidated, it may be validated by another gaming device at a later time. In 1055, the server sends the reply to the instrument transaction owner to mark the validation request from pending to unvalidated which allows the instrument to be validated later.

FIG. 12 is a block diagram of the components of a printed ticket voucher that may be used as a configuration instrument 1200. The printed ticket voucher does not include any information that allows the identity of the player to be determined. In one embodiment, the ticket voucher may include biometric information that allows the user of the ticket to be validated without revealing their identity. For instance, the ticket may include encoded finger print information that may be compared with finger print information read a game player using a biometric input device on a gaming machine. When the finger print information encoded on the ticket and received from the biometric input device agree, then the ticket may be validated. With this method, assuming that their finger print information is not correlated with any other identification information, the player does not have to provide a name or any other identification information that allows them to be identified.

The format of the ticket voucher 1200 may be generated from a template stored within a printer located on a gaming device and is not limited to the format shown in the figure. The printing templates allow parameter values sent from the master gaming controller on a gaming machine or from another gaming device such as a CVT (see 460 and 470) or a cashier station (see 425, 430 and 435) to be printed in the format of the configuration instrument 1200, a receipt or some other format. Examples of parameter values that may be printed on a ticket voucher include but are not limited to: 1) an establishment 1202, a location 1204 (e.g. city, state and zip code), 3) a ticket type 1206 (e.g. cashout, receipt, duplicate, duplicate receipt, etc.), 4) a bar code 1208, 5) a ticket validation number 1210, 6) an issue date and issue time 1212, 7) a ticket number 1213, 8) a textual ticket value 1214, 9) a numerical ticket value 1216, 10) an expiration date 1218, 11) a machine number 1220 and 12) preference information 1222. In addition, preprinted graphics or text, including "INSERT THIS SIDE UP" 1211, may be printed on each ticket.

The preference information may be printed in a alphanumeric format 1222 in English or another language, a bar code format 1208 and combinations thereof. Although other symbolic printing methods may also be used. The preference information 1222 that is printed on the ticket corresponds to a game type, "Little Green Men," and a bonus game type, "Space Bonus Game." The textual information may be used to remind the player of the preference information stored on the voucher. Additional, preference information may be encoded in the bar-code 1208. The information in the bar-code may be in format that may be interpreted by a gaming machine to configure the gaming machine according to the selected preferences. It may be different than the textual information printed on the ticket and may include additional information than is what is encoded on the ticket. For instance, "Little Green Men," and "Space Bonus Game," may be represented as a "1" and "2" in the bar-code. Further, additional parameters not meaningful to the player but needed by the gaming machine to configure itself may be incorporated in the bar-code 1208. In one embodiment, the preference information 1222 in the text format may be simply printed on the ticket to remind the player of a game that was configured in a desirable manner and most of the preference information is encoded in the bar-code format or some other format that is not readable by the player. In another embodiment, information may be printed on the ticket voucher in an encrypted format.

In one embodiment of the present invention, the preference information may be selected by the player using a touch screen interface, as was described with respect to FIG. 1A, or another input means. In another embodiment, the preference information may be selected by a gaming establishment that operates the gaming device that issued the configuration instrument. For example, preference information may be incorporated into to the bar-code of a ticket voucher by the gaming establishment without the knowledge of the player. When the ticket voucher is used in a gaming machine to add credits, the gaming machine may be automatically configured according to preference information stored on the ticket without the knowledge of the player.

Although the foregoing invention has been described in some detail for purposes of clarity of understanding, it will be apparent that certain changes and modifications may be practiced within the scope of the appended claims. For instance, while the gaming machines of this invention have been depicted as having gaming devices physically attached to a main gaming machine cabinet, the use of gaming devices in accordance with this invention is not so limited. For example, the display screen features which may be provided on a top box may be included in a stand alone cabinet proximate to, but unconnected to, the main gaming machine chassis.

What is claimed is:

1. A method of configuring a gaming machine according to one or more preferences, the method comprising:
    providing a gaming machine operable to generate a game play for a wager-based game comprising a first input device designed to read preference information stored on the first configuration instrument when the first configuration instrument is presented by a game player at the gaming machine;
    receiving preference information stored on the first configuration instrument carried by the game player via the first input device including preferences selected by the game player or preferences selected by a gaming establishment;
    receiving preference information stored on the first configuration instrument via the first input device including first preference information selected by the gaming establishment wherein the first preference information specifies one or more preferences selected by the gaming establishment and stored to the first configuration instrument without knowledge of the game player;
    comparing preferences specified by the preference information stored on the first configuration instrument with preferences available on the gaming machine to determine whether the gaming machine is configurable to utilize the preference information;
    for each preference specified by the preference information for which the gaming machine is determined configurable, configuring the gaming machine using the preference information; and
    generating the play of the wager-based game on the gaming machine.

2. The method of claim 1, wherein the preference information comprises one or more of promotional opportunities, preferred games, preferred game features for said preferred games, preferred gaming machine settings, preferred bonus games and preferred progressive games.

3. The method of claim 2, wherein the preferred games are selected from the group consisting of video slots games, video poker games, video black jack games, video pachinko games, video card games, video keno games and video games of chance.

4. The method of claim 2, wherein the preferred gaming features for said preferred games is selected from the group consisting of game versions, game color schemes, game graphical features, a game presentation speed, game paytables and game audio features.

5. The method of claim 2, wherein the preferred gaming machine settings is selected from the group consisting of a volume setting, an input interface configuration, a display setting, a denomination setting, a betting preference settings, a language setting and a beverage setting.

6. The method of claim 1, wherein the first configuration instrument is selected from the group consisting of a printed ticket, a cell phone, a magnetic striped-card, a smart card, an optical scan sheet, a media printed with preference information, a cell phone and a hand-held computing device.

7. The method of claim 1, further comprising:
reading the preference information from the first configuration instrument.

8. The method of claim 7, wherein the preference information is read from the first configuration instrument using one or more of a ticket reader, a bar-code reader, a card reader, a wire-less interface, a bill validator, an optical scan sheet reader, a text scanner and a smart card reader.

9. The method of claim 1, further comprising:
displaying the preference information to a video display.

10. The method of claim 1, wherein the gaming machine is configured without receiving a player tracking card from a game player participating in the game play.

11. The method of claim 1, wherein the gaming machine is configured without receiving identification information from a game player participating in the game play.

12. The method of claim 1, wherein the gaming machine is configured without accessing a player tracking account of a game player participating in the game play.

13. The method of claim 1, wherein the gaming machine is configured without accessing a remote server connected to the gaming machine.

14. The method of claim 1, wherein a portion of the preference information is selected by a patron of a gaming establishment that maintains the gaming machine.

15. The method of claim 1, wherein the first configuration instrument is designed to store authentication information used to validate the first configuration instrument.

16. The method of claim 15, wherein the authentication information is selected from the group consisting of a bar code, an instrument type, an issue date, a validation number, an issue time, an instrument number, an instrument sequence number, a gaming machine identification number and biometric information.

17. The method of claim 1, wherein the first configuration instrument is designed to store indicia of credit information used to add credits for the game play on the gaming machine.

18. The method of claim 17, wherein the credits are promotional credits.

19. The method of claim 1, further comprising:
storing preference information to the first configuration instrument.

20. The method of claim 19, further comprising:
configuring a second gaming machine using the first configuration instrument.

21. The method of claim 20, wherein a configuration of the second gaming machine is the same as the configuration of the gaming machine.

22. The method of claim 20, wherein a configuration of the second gaming machine is different than the configuration of the gaming machine.

23. The method of claim 1, further comprising:
generating a second configuration instrument.

24. The method of claim 23, wherein the second configuration instrument is a generated using a printer and a printable media.

25. The method of claim 23, wherein the second configuration instrument stores one or more of the following preference information that is stored on the first configuration instrument, preference information that is input using a display interface, preference information received from a remote server, preference information generated by the gaming machine, preference information input using a speech recognition interface and combinations thereof.

26. The method of claim 23, further comprising:
storing indicia of credit information to the second configuration instrument wherein the indicia of credit information is used to add credits to the gaming machine.

27. The method of claim 1, further comprising:
without receiving preference information during a game play session from a game player, executing a game play on the gaming machine; and
generating a second configuration instrument.

28. The method of claim 1, generating a second configuration instrument wherein the second configuration instrument stores preference information received from one or more of a remote server, preference information generated by the gaming machine based upon the gaming play and combinations thereof.

29. The method of claim 28, further comprising:
configuring a second gaming machine using the second configuration instrument.

30. The method of claim 28, further comprising:
adding credits used for a game play on a second gaming machine using the second configuration instrument.

31. The method of claim 1, further comprising:
adding credits to the gaming machine using indicia of credit information stored on the first configuration instrument.

32. The method of claim 31, further comprising:
authenticating the indicia of credit information stored on the first configuration instrument.

33. The method of claim 1, further comprising:
sending preference information to the remote server.

34. The method of claim 1, further comprising:
authenticating the first configuration instrument.

35. The method of claim 34, further comprising:
when the first configuration instrument is not authentic,
blocking configuration of the gaming machine using the preference information received from the first configuration instrument.

36. The method of claim 1, further comprising:
sending an authentication request to the remote server wherein the authentication request comprises information used by the remote server to authenticate the first configuration instrument.

37. The method of claim 36, further comprising:
receiving an authentication reply from the remote server wherein the authentication reply comprises information indicating an authentication status of the first configuration instrument.

38. The method of claim 37, further comprising:
when the authentication status of the first configuration instrument is non-authentic, blocking the configuration of the gaming machine using the preference information received from the first configuration instrument.

39. The method of claim 1, further comprising:
storing the preference information to a memory storage device on the gaming machine.

40. The method of claim 1, further comprising:
outputting preference information to an audio device.

41. The method of claim 1, further comprising:
for a bonus game that uses game events from multiple games to determine a bonus game outcome,
storing bonus game information about a state of the bonus game to a second configuration instrument.

42. The method of claim 41, further comprising:
on a second gaming machine, reading bonus game information from the second configuration instrument and initializing the bonus game to the state of the bonus game indicated by the bonus game information.

43. The method of claim 1, further comprising:
reading bonus game information from the first configuration instrument and initializing the bonus game to a state of the bonus game indicated by the bonus game information.

44. The method of claim 1, further comprising:
loading one or more software modules used to configure the gaming machine from a memory storage device and executing the game play on the gaming machine using the one or more software modules.

45. The method of claim 1, further comprising:
downloading one or more software modules used to configure the gaming machine from a remote storage device and executing the game play on the gaming machine using the one or more software modules.

46. The method of claim 1, further comprising:
printing a ticket voucher used as the first configuration instrument using a printer connected to a computer located in a player's home.

47. A gaming machine comprising:
a master gaming controller that is designed or configured i) to control a wager-based game played on the gaming machine ii) to receive preference information stored on a first configuration instrument carried by a game player including preferences selected by the game player or preferences selected by a gaming establishment; iii) to receive preference information stored on the first configuration instrument including first preference information selected by the gaming establishment wherein the first preference information specifies one or more preferences selected by the gaming establishment and stored to the first configuration instrument without knowledge of the game player; iv) to compare the preferences specified by the preference information stored on the first configuration instrument with preferences available on the gaming machine to determine whether the gaming machine is configurable to utilize the preference information, v) for each preference specified by the preference information for which the gaming machine is determined configurable, to configure the gaming machine using the preference information; and vi) to generate the play of the first wager-based game on the gaming machine;
one or more input devices used to input the preference information into the gaming machine; and
a first input device designed to read the preference information stored on the first configuration instrument including the preferences selected by the game player or the preferences selected by the gaming establishment when the first configuration instrument is presented by the game player at the gaming machine.

48. The gaming machine of claim 47, wherein the preference information comprises one or more of promotional opportunities, preferred games, preferred game features for said preferred games, preferred gaming machine settings, preferred bonus games and preferred progressive games.

49. The gaming machine of claim 48, wherein the preferred games are selected from the group consisting of video slots games, video poker games, video black jack games, video pachinko games, video card games, video keno games and video games of chance.

50. The gaming machine of claim 48, wherein the preferred gaming features for said preferred games is selected from the group consisting of game versions, game color schemes, game graphical features, a game presentation speed, game paytables and game audio features.

51. The gaming machine of claim 48, wherein the preferred gaming machine settings is selected from the group consisting of a volume setting, an input interface configuration, a display setting, a denomination setting, a betting preference settings, a language setting and a beverage setting.

52. The gaming machine of claim 47, wherein the first configuration instrument is selected from the group consisting of a printed ticket, a cell phone, a magnetic striped-card, a smart card, an optical scan sheet, a media printed with preference information, a cell phone and a hand-held computing device.

53. The gaming machine of claim 47, wherein the preference information is read from the first configuration instrument using one or more of a ticket reader, a bar-code reader, a card reader, a wire-less interface, a bill validator, an optical scan sheet reader, a text scanner and a smart card reader.

54. The gaming machine of claim 47, wherein the first configuration instrument is designed to store authentication information used to authenticate the first configuration instrument.

55. The gaming machine of claim 54, wherein the authentication information is selected from the group consisting of a bar code, an instrument type, an issue date, a validation number, an issue time, an instrument number, an instrument sequence number, a gaming machine identification number and biometric information.

56. The gaming machine of claim 47, wherein the first configuration instrument is designed to store indicia of credit information used to add credits for game play on the gaming machine.

57. The gaming machine of claim 56, wherein the credits are promotional credits.

58. The gaming machine of claim 47, further comprising:
one or more output devices used to store the preference information to the first configuration instrument.

59. The gaming machine of claim 47, wherein the first configuration instrument is used to configure a second gaming machine.

60. The gaming machine of claim 59, wherein a configuration of the second gaming machine is the same as the configuration of the gaming machine.

61. The gaming machine of claim 59, wherein a configuration of the second gaming machine is different than the configuration of the gaming machine.

62. The gaming machine of claim 47, wherein the first configuration instrument is used as an indicia of credit for game play on the gaming machine.

63. The gaming machine of claim 47, wherein the master gaming controller is further designed or configured to authenticate the first configuration instrument.

64. The gaming machine of claim 47, further comprising:
a video display used to display the preference information.

65. The gaming machine of claim 64, wherein the video display further comprises a touch screen used to input the preference information.

66. The gaming machine of claim 65, wherein the master gaming controller is further designed or configured to generate a touch screen interface used to input the preference information.

67. The gaming machine of claim 47, wherein one of the input devices is a card reader used to read player tracking information from a player tracking card and wherein the gaming machine is configured without receiving the player tracking card.

68. The gaming machine of claim 47, wherein the gaming machine is configured without receiving identification information from a user that plays the game on the gaming machine.

69. The gaming machine of claim 47, wherein the gaming machine is configured without accessing a player tracking account of a user that plays the game on the gaming machine.

70. The gaming machine of claim 47, wherein the gaming machine is configured without accessing a remote server.

71. The gaming machine of claim 47, wherein the preference information is selected by a patron of a gaming establishment that maintains the gaming machine.

72. The gaming machine of claim 47, further comprising: a printer designed to print on a printable media.

73. The gaming machine of claim 72, wherein the master gaming controller is further designed or configured to generate a second configuration instrument by using the printer to print preference information to the printable media.

74. The gaming machine of claim 73, wherein the second configuration instrument stores one or more of the following: preference information that is read from a first configuration instrument, preference information that is input using a touch screen display interface, preference information that is received from a remote server, preference information that is generated by the gaming machine, preference information that is input using a speech recognition interface and combinations thereof.

75. The gaming machine of claim 73, wherein the second configuration instrument is configured to be used as an indicia of credit for game play on the gaming machine.

76. The gaming machine of claim 73, wherein master gaming controller is further designed or configured to store credits to the second configuration instrument.

77. The gaming machine of claim 47, further comprising: a communication interface used to communicate with a remote server.

78. The gaming machine of claim 77, wherein the master gaming controller is further designed or configured to send the preference information to the remote server.

79. The gaming machine of claim 78, wherein the master gaming controller is further designed or configured to send an authentication request to the remote server wherein the authentication request comprises information used by the remote server to authenticate a configuration instrument.

80. The gaming machine of claim 47, further comprising: a memory device used to store the preference information.

81. The gaming machine of claim 47, wherein the master gaming controller is further designed or configured to generate the preference information.

82. The gaming machine of claim 47, further comprising: a microphone used to receive preference information.

83. The gaming machine of claim 82, wherein the master gaming controller is further designed or configured to recognize speech patterns containing the preference information input using the microphone.

84. The gaming machine of claim 47, further comprising: a sound projection device used to output the preference information.

85. The gaming machine of claim 47, wherein the preference information includes bonus game information that indicates a state of a bonus game.

86. The gaming machine of claim 85, wherein the master gaming controller is further designed to configure the bonus game to the state of the bonus game indicated by the bonus game information.

87. The gaming machine of claim 86, wherein the bonus game generates a bonus award using game events that occur during a plurality of game plays.

88. The gaming machine of claim 47, wherein the master gaming controller is further designed to load one or more software modules used to configure the gaming machine from a memory storage device and to execute the game play on the gaming machine using the one or more software modules.

89. The gaming machine of claim 47, wherein the master gaming controller is further designed to download one or more software modules used to configure the gaming machine from a remote storage device and to execute the game play on the gaming machine using the one or more software modules.

90. The method of claim 1, wherein the preference information is not correlated to an identity of a player so that the identity of the player can not be determined from the preference information.

91. The gaming machine of claim 47, wherein the preference information is not correlated to an identity of a player so that the identity of the player can not be determined from the preference information.

\* \* \* \* \*